US010900900B2

United States Patent
Osawa et al.

(10) Patent No.: US 10,900,900 B2
(45) Date of Patent: Jan. 26, 2021

(54) STRUCTURED ILLUMINATION MICROSCOPE, OBSERVATION METHOD, AND STORAGE MEDIUM

(71) Applicant: NIKON CORPORATION, Tokyo (JP)

(72) Inventors: Hisao Osawa, Tokyo (JP); Fumihiro Dake, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 328 days.

(21) Appl. No.: 15/956,795

(22) Filed: Apr. 19, 2018

(65) Prior Publication Data

US 2018/0238803 A1    Aug. 23, 2018

Related U.S. Application Data

(63) Continuation of application No. PCT/JP2015/079422, filed on Oct. 19, 2015.

(51) Int. Cl.
*G02B 21/06* (2006.01)
*G01N 21/64* (2006.01)
(Continued)

(52) U.S. Cl.
CPC ..... *G01N 21/6458* (2013.01); *G02B 21/0092* (2013.01); *G02B 21/08* (2013.01);
(Continued)

(58) Field of Classification Search
CPC ...... G02B 1/08; G02B 21/00; G02B 21/0004; G02B 21/0052; G02B 21/0056;
(Continued)

(56) References Cited

U.S. PATENT DOCUMENTS 5,748,164 A * 5/1998 Handschy ............ G09G 3/3406
345/84
6,525,709 B1 * 2/2003 O'Callaghan ........ G09G 3/2011
345/100
(Continued)

FOREIGN PATENT DOCUMENTS

JP    2000-292772 A    10/2000
JP    2001-042290 A    2/2001
(Continued)

OTHER PUBLICATIONS

Jun. 24, 2019 Search Report issued in European Patent Application No. 15906628.1.
(Continued)

*Primary Examiner* — Arnel C Lavarias
(74) *Attorney, Agent, or Firm* — Oliff PLC

(57) ABSTRACT

A structured illumination microscope includes: a brancher that includes a first substrate on which a plurality of pixel electrodes are provided; a second substrate opposed to the first substrate; and a ferroelectric liquid crystal disposed between the first substrate and the second substrate, and branches light from a light source into diffracted light beams; an illumination optical system that illuminates a sample with interference fringes formed by at least some of the diffracted light beams; an imaging device that forms an image of the sample irradiated with the interference fringes; a demodulator; and a controller that controls a direction and a phase of the interference fringes. In one frame period during which the imaging device takes the image, the controller applies a first voltage pattern and a second voltage pattern obtained by inverting the first voltage pattern to at least some of the pixel electrodes.

13 Claims, 25 Drawing Sheets

(51) Int. Cl.
  *G02B 27/58* (2006.01)
  *G02B 21/08* (2006.01)
  *G02B 21/36* (2006.01)
  *G02B 21/00* (2006.01)
  *G02B 21/16* (2006.01)

(52) U.S. Cl.
  CPC ........... *G02B 21/082* (2013.01); *G02B 21/16* (2013.01); *G02B 21/367* (2013.01); *G02B 27/58* (2013.01)

(58) Field of Classification Search
  CPC ............ G02B 21/0076; G02B 21/0072; G02B 21/008; G02B 21/0092; G02B 21/06; G02B 21/36; G02B 21/361; G02B 21/365; G02B 21/367; G02F 1/0027; G02F 1/0045; G02F 1/13; G02F 1/133; G02F 1/135; G02F 1/141
  USPC ....... 359/362, 363, 368, 369, 370, 371, 385, 359/386, 388, 389, 390; 349/171, 172, 349/184
  See application file for complete search history.

(56) References Cited

U.S. PATENT DOCUMENTS

| | | | |
|---|---|---|---|
| 6,545,656 | B1 | 4/2003 | Yamazaki |
| 8,115,806 | B2 | 2/2012 | Osawa et al. |
| 2015/0185463 | A1 | 7/2015 | Ohki et al. |
| 2016/0320600 | A1 | 11/2016 | Dake et al. |

FOREIGN PATENT DOCUMENTS

| | | |
|---|---|---|
| JP | 2006-145591 A | 6/2006 |
| JP | 2008-145591 A | 6/2008 |
| JP | 2009-116173 A | 5/2009 |
| JP | 2010-116173 A | 5/2010 |
| JP | 2010-239148 A | 10/2010 |
| JP | 5301223 B2 | 9/2013 |
| JP | 2015-055706 A | 3/2015 |
| WO | 2014/013720 A1 | 1/2014 |
| WO | 2015/087960 A1 | 6/2015 |

OTHER PUBLICATIONS

Hui-Wen Lu-Walther et al. "Fastsim: A Practical Implementation of Fast Structured Illumination Microscopy". Methods and Applications in Fluorescence, vol. 3, No. 1, Jan. 16, 2015, pp. 014001.
Jul. 9, 2019 Office Action issued in Japanese Patent Application No. 2017-546286.
Jan. 26, 2016 International Search Report issued in International Patent Application No. PCT/JP2015/079422.
Jan. 26, 2016 Written Opinion issued in International Patent Application No. PCT/JP2015/079422.
Lin Shao et al. "Super-Resolution 3D Microscopy of Live Whole Cells Using Structured Illumination". Nature Methods, vol. 8, No. 12, Dec. 2011, pp. 1044-1048.

* cited by examiner

STRUCTURED ILLUMINATION MICROSCOPE, OBSERVATION METHOD, AND STORAGE MEDIUM

CROSS REFERENCE TO RELATED APPLICATION

This is a Continuation of PCT Application No. PCT/JP2015/079422, filed on Oct. 19, 2015. The contents of the above-mentioned application are incorporated herein by reference.

FIELD OF THE INVENTION

The present invention relates to a structured illumination microscope, an observation method, and a storage medium.

BACKGROUND

Types of microscope devices include a super-resolution microscope, which enables observation with a resolution higher than the limit of resolution of optical systems. One form of the super-resolution microscope is known as a structured illumination microscope (SIM), which illuminates a sample with a fringe pattern (structured illumination) to acquire modulated images and demodulates the modulated images to generate a super-resolution image of the sample (see, for example, Patent Literature 1). This method involves branching a beam that has been emitted from a light source into a plurality of beams with a diffraction grating or the like, and illuminating a sample with interference fringes formed by causing the beams to interfere with each other in the sample, thereby acquiring modulated images of the sample. In the structured illumination microscope, the phase and the orientation of structured illumination are changed, and hence the number of images to be acquired increases. Thus, it is expected for the structured illumination device to be capable of switching structured illumination at high speed.

Examples of technology for speeding up the switching of structured illumination include a method disclosed in Non Patent Literature 1. In Non Patent Literature 1, a spatial light modulator (SLM) is used as a diffraction grating. The SLM is able to change the orientation and the phase of structured illumination by controlling voltage of each pixel, and hence does not need to be mechanically driven. When ferroelectric liquid crystals (FLC), in which molecules have spontaneous polarization, is used for the SLM, the operation higher than that with nematic liquid crystals is achieved.

For example, the SLM of FLC type includes a first substrate on which a plurality of pixel electrodes are formed, a second substrate on which a transparent electrode is formed, and a ferroelectric liquid crystal layer disposed between the first substrate and the second substrate. For example, the SLM applies voltage having positive potential and voltage having negative potential to the pixel electrodes. When the temporal sum of potential difference between the first substrate and the second substrate is not 0, that is, when a DC component of voltage is present, internal ions of ferroelectric liquid crystals are attracted in one direction due to the bias in DC component, resulting in the occurrence of image burn-in. Image burn-in due to an electric field between substrates is typically prevented by applying a reverse voltage so as to cancel out DC components of voltage applied between the electrodes (see, for example, Patent Literature 1). For example, a display period and a non-display period are alternately provided, and voltage reverse to voltage in the display period is applied in the non-display period to prevent image burn-in.

CITATION LIST

Patent Literature

[Patent Literature 1] Japanese Patent No. 5301223

Non Patent Literature

[Non Patent Literature 1] L. Shao et al., "Super-resolution 3D microscopy of live whole cells using structured illumination", Nature Methods 12, 1044 (2011)

However, in the structured illumination microscope, if the time during which the reverse voltage is applied is increased, the frame rate for acquiring images is reduced.

SUMMARY

According to a first aspect of the present invention, structured illumination microscope is provided with: an optical modulator including (i) a substrate provided with a plurality of pixel electrodes and (ii) an electro-optic element; an illumination optical system that illuminates a sample with an interference fringe formed by at least some of a plurality of light beams emitted by the optical modulator; an imaging device that captures an image of the sample illuminated with the interference fringe; a demodulator that generates an image of the sample using a plurality of the images captured by the imaging device; and a controller, wherein: while the imaging device captures the image, the controller applies to at least some of the plurality of pixel electrodes (i) a first voltage pattern and (ii) a second voltage pattern that is inverted with respect to the first voltage pattern.

According to a second aspect of the present invention, a structured illumination microscope is provided with: an optical modulator including (i) a substrate provided with a plurality of pixel electrodes and (ii) an electro-optic element; an illumination optical system that illuminates a sample with an interference fringe formed by at least some of a plurality of light beams emitted by the optical modulator; an imaging device that captures an image of the sample illuminated with the interference fringe; a demodulator that generates an image of the sample using a plurality of the images captured by the imaging device; and a controller, wherein: the controller applies (i) a first voltage pattern to at least some of the plurality of pixel electrodes in a first frame period during which the imaging device captures the image and (ii) a second voltage pattern that is inverted with respect to the first voltage pattern in a second frame period during which the image is captured, and the demodulator performs a demodulation process using at least (i) an image captured in the first frame period and (ii) an image captured in the second frame period. According to an aspect of this invention, an observation method includes: branching light from a light source into a plurality of diffracted light beams by an optical modulator including (i) a substrate provided with a plurality of pixel electrodes and (ii) an electro-optic element; illuminating a sample with an interference fringe formed by at least some of the plurality of diffracted light beams; capturing images of the sample illuminated with the interference fringe; performing a demodulation process using a plurality of the captured images; and applying to at least some of the plurality of pixel electrodes, while capturing the images, (i) a first voltage pattern and (ii) a second voltage pattern that is inverted with respect to the first voltage pattern.

According to a third aspect of the present invention, an observation method includes: branching light from a light source into a plurality of diffracted light beams by an optical modulator including (i) a substrate provided with a plurality of pixel electrodes and (ii) an electro-optic element; illuminating a sample with an interference fringe formed by at least some of the plurality of diffracted light beams; capturing images of the sample illuminated with the interference fringe; performing a demodulation process using a plurality of the captured images; applying (i) a first voltage pattern to at least some of the plurality of pixel electrodes in a first frame period during which the images are captured and (ii) a second voltage pattern that is inverted with respect to the first voltage pattern in a second frame period during which the images are captured; and performing the demodulation process using at least (i) an image captured in the first frame period and (ii) an image captured in the second frame period.

According to a fourth aspect of the present invention, a microscope control program is provided that causes a computer to execute: branching light from a light source into a plurality of diffracted light beams by an optical modulator including (i) a substrate provided with a plurality of pixel electrodes and (ii) an electro-optic element; illuminating a sample with an interference fringe formed by at least some of the plurality of diffracted light beams; capturing images of the sample illuminated with the interference fringe; performing a demodulation process using a plurality of the captured images; and applying to at least some of the plurality of pixel electrodes, while capturing the images, (i) a first voltage pattern and (ii) a second voltage pattern that is inverted with respect to the first voltage pattern.

According to a fifth aspect of the present invention, a microscope control program is provided that causes a computer to execute; branching light from a light source into a plurality of diffracted light beams by an optical modulator including (i) a substrate provided with a plurality of pixel electrodes and (ii) an electro-optic element; illuminating a sample with an interference fringe formed by at least some of the plurality of diffracted light beams; capturing images of the sample illuminated with the interference fringe; performing a demodulation process using a plurality of the captured images; applying (i) a first voltage pattern to at least some of the plurality of pixel electrodes in a first frame period during which the images are captured and (ii) a second voltage pattern that is inverted with respect to the first voltage pattern in a second frame period during which the images are captured; and performing the demodulation process using at least (i) an image captured in the first frame period and (ii) an image captured in the second frame period.

According to a sixth aspect of the present invention, a structured illumination microscope is provided with: a first substrate provided with a plurality of pixel electrodes; a second substrate facing the first substrate; a ferroelectric liquid crystal disposed between the first substrate and the second substrate; a branching section that splits light from a light source into a plurality of diffracted light beams; an illumination optical system that illuminates a sample with an interference fringe formed by at least some of the plurality of diffracted light beams; an imaging device that forms an image of a sample illuminated with the interference fringe; an imaging device that captures images of the image formed by the imaging device; a demodulator that performs a demodulation process using a plurality of the images; captured by the imaging device; and a controller that controls a direction and a phase of the interference fringe; wherein, the controller applies to at least some of the plurality of pixel electrodes in one frame period in which the imaging device captures the images, (i) a first voltage pattern and (ii) a second voltage pattern that is inverted with respect to the first voltage pattern.

DETAILED DESCRIPTION OF EMBODIMENTS

Figure 1:
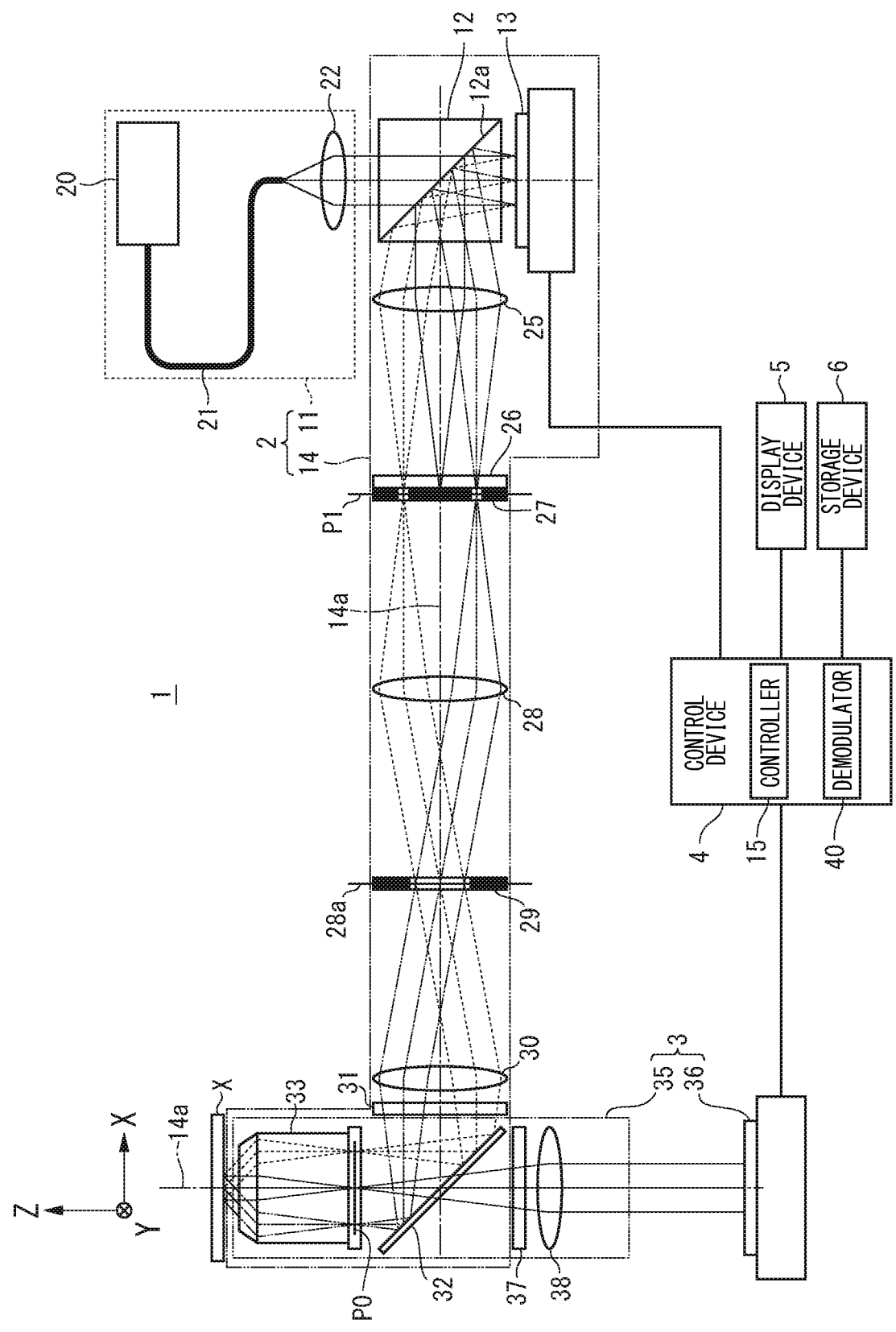
FIG. 1 is a diagram illustrating a structured illumination microscope according to an embodiment.

Next, embodiments are described with reference to the accompanying drawings. FIG. 1 is a diagram illustrating a structured illumination microscope 1 according to an embodiment. The structured illumination microscope 1 includes a structured illumination device 2, an imaging device 3, a control device 4, a display device 5, and a storage device 6. For example, the structured illumination microscope 1 is a fluorescence microscope that is used to observe a sample X including cells dyed with fluorescent dye in advance. For example, the sample X is held by a stage (not shown).

The structured illumination microscope 1 schematically operates as follows. The structured illumination device 2 forms interference fringes, and illuminates a sample X with the interference fringes. The imaging device 3 takes a fluorescent image of the sample X illuminated with the interference fringes. The fluorescent image includes an image modulated by the interference fringes (for example, moire image). The control device 4 controls the components in the structured illumination microscope 1. Specifically, the control device 4 controls the structured illumination device 2 to switch interference fringes to a plurality of states, controls the imaging device 3 to take images of the sample X with the interference fringes, performs demodulation processing by using the taken images to form a super-resolution image with a resolution that is higher than the resolution limit of an optical system in the imaging device 3, and displays the super-resolution image on the display device 5. The control device 4 is further able to store data on the formed super-resolution image in the storage device 6.

The structured illumination microscope 1 has a 2D-SIM mode for forming a two-dimensional super-resolution image of a surface to be observed (hereinafter referred to as "sample surface") of a sample X and a 3D-SIM mode for forming a three-dimensional super-resolution image including information in a direction perpendicular to the sample surface. The 2D-SIM mode is described first, and the 3D-SIM mode is described next.

The structured illumination device 2 includes a light source 11 (light source device), a polarization separation element 12, a brancher 13, an illumination optical system 14, and a controller 15. For example, the controller 15 is provided in the control device 4, but may be provided separately from the control device 4. In the following description, an XYZ orthogonal coordinate system illustrated in FIG. 1 and other figures is referred to as appropriate. In the XYZ orthogonal coordinate system, the Z direction is a direction parallel to an optical axis of an imaging optical system 35 (described later). The X direction is any direction orthogonal to the Z direction, and the Y direction is a direction orthogonal to the X direction and the Z direction.

For example, the light source 11 includes a light source 20, a light guide member 21, and a collimator 22. For example, the light source 20 includes a laser diode, and emits coherent light such as laser light. In the following description, light emitted from the light source 20 is referred to as "illumination light". For fluorescent observation using the structured illumination microscope 1, the wavelength of the illumination light is set to a wavelength band including the excitation wavelength of a fluorescent substance included in a sample X. For example, the light guide member 21 includes an optical fiber, and guides illumination light from the light source 20 to the collimator 22. The collimator 22 converts illumination light from the light guide member 21 into collimated light.

At least a part of the light source 11 is not necessarily required to be included in the structured illumination device 2. For example, the light source 11 may be unitized and provided replaceably (mountably, removably) to/from the structured illumination device 2. For example, the light source 11 may be mounted to the structured illumination device 2 when used for observation with the structured illumination microscope 1.

For example, the polarization separation element 12 is a polarization beam splitter prism. The polarization separation element 12 has a polarization separation film 12a that is inclined at, for example, 45° with respect to an optical axis of the collimator 22. The polarization separation film 12a has characteristics that transmit P-polarized light with respect to the polarization separation film 12a and reflect S-polarized light with respect to the polarization separation film 12a. In this case, the light source 11 emits P-polarized light (polarized light in the X direction) with respect to the polarization separation film 12a as illumination light, and the illumination light from the collimator 22 is transmitted through the polarization separation film 12a to enter the brancher 13.

The brancher 13 branches light from the light source into a plurality of diffracted light beams. In FIG. 1, 0th order diffracted light (illustrated by solid lines), +1st order diffracted light (illustrated by broken lines), and −1st order diffracted light (illustrated by two-dot chain lines) among a plurality of light beams are representatively illustrated. In the following description, when one or both of +1st order diffracted light and −1st order diffracted light among diffracted light beams are referred to, the light beams are simply referred to as "1st order diffracted light". The brancher 13 is controlled by the controller 15, and is able to change the state (phase and direction) of the periodic structure to a state instructed by the controller 15.

For example, the brancher 13 converts the polarization state of illumination light from the polarization separation element 12 from P-polarization into S-polarization. Illumination light emitted from the brancher 13 is S-polarized light because the brancher 13 serves also as a phase plate, and is reflected by the polarization separation film 12a in the polarization separation element to enter the illumination optical system 14. The configuration of the brancher 13 is described later with reference to FIG. 2, FIG. 3, and other figures.

The illumination optical system 14 illuminates a sample with interference fringes formed by at least some of the diffracted light beams. For example, in the 2D-SIM mode, the illumination optical system 14 illuminates a sample with interference fringes formed by interference between +1st order diffracted light and −1st order diffracted light among a plurality of diffracted light beams. In the 2D-SIM mode, for example, the illumination optical system 14 forms interference fringes of +1st order diffracted light and −1st order diffracted light, and does not use 0th order diffracted light and 2nd or higher order diffracted light for the formation of interference fringes. The illumination optical system 14 may form interference fringes by diffracted light other than ±1st order diffracted light (the same applies hereinafter). For example, the illumination optical system 14 may form interference fringes of +1st order diffracted light and +3rd order diffracted light, and may form interference fringes of 0th order diffracted light and 2nd order diffracted light. For example, the illumination optical system 14 includes a lens member having a rotationally symmetric shape, such as a spherical lens and an aspherical lens. The axis of symmetry of the lens member is hereinafter referred to as "the optical axis 14a of the illumination optical system 14". The illumination optical system 14 may include a freeform lens.

The illumination optical system 14 includes, in the order from the brancher 13 toward the sample X, a lens 25, a ½ wavelength plate 26, a mask 27, a lens 28, a field stop 29, a lens 30, a filter 31, a dichroic mirror 32, and an objective lens 33. The illumination optical system 14 may include at least a part of the light source 11, may include the polarization separation element 12, and may include the brancher 13.

Diffracted light generated by the brancher 13 enters the lens 25 through the polarization separation element 12. For example, the lens 25 is disposed such that a focal point thereof substantially matches with that of the brancher 13. The lens 25 condenses diffracted light beams having the same order among a plurality of light beams branched by the brancher 13 to a corresponding position on what is called a pupil conjugate plane P1, which is a position conjugate with a rear focal plane of the objective lens 33 (pupil plane). The lens 25 condenses +1st order diffracted light generated by the brancher 13 to a position away from the optical axis 14a on the pupil conjugate plane P1. The lens 25 condenses −1st order diffracted light generated by the brancher 13 to a position symmetric with +1st order diffracted light across the optical axis 14a.

For example, the ½ wavelength plate 26 is disposed in an optical path between the lens 25 and the lens 28, and adjusts the polarization state of illumination light such that the polarization state of illumination light with respect to the sample surface when the illumination light enters the sample X becomes S-polarization. For example, when the direction in which 1st order diffracted light is deflected from 0th order diffracted light (hereinafter referred to as "diffraction direction") is within the XZ plane, the ½ wavelength plate 26 adjusts the polarization state of illumination light exiting from the illumination optical system 14 such that the polarization state of the illumination light becomes linear polarization in the Y direction. When the diffraction direction is changed in the brancher 13, the incident plane of 1st order diffracted light on the sample X is rotated around the Z direction, and hence the ½ wavelength plate 26 adjusts the polarization state of the illumination light in accordance with the diffraction direction. The ½ wavelength plate 26 may be disposed at any position in the optical path between the polarization separation element 12 and the sample X.

The mask 27 transmits diffracted light used to form interference fringes, and blocks diffracted light not used to form interference fringes. In the 2D-SIM mode, the mask transmits 1st order diffracted light, and blocks 0th order diffracted light and 2nd or higher order diffracted light. The mask 27 is disposed at a position at which an optical path of 0th order diffracted light and an optical path of 1st order diffracted light are separated from each other, for example, at a plane conjugate with the rear focal plane of the objective lens 33 (pupil conjugate plane P1). For example, the mask 27 is an aperture stop, and limits diffracted light of light beams entering the sample X. In the mask 27, portions through which 0th order diffracted light enters are light blocking portions, and portions through which 1st order diffracted light enters are openings (transmitting portions). In the mask 27, the portions through which 0th order diffracted light enters may be a shutter capable of switching between the transmission and block of 0th order diffracted light, and may be closed in the 2D-SIM mode.

Illumination light that has passed through the mask 27 enters the lens 28. The lens 28 forms a plane optically conjugate with the brancher 13 (hereinafter referred to as "intermediate image plane 28a"). For example, the field stop 29 is disposed on the intermediate image plane 28a. The field stop 29 regulates the range (illumination field, illumination region) where the sample X is irradiated with illumination light from the illumination optical system 14 in a plane perpendicular to the optical axis 14a of the illumination optical system 14.

Illumination light that has passed through the field stop 29 enters the lens 30. The lens 30 condenses ±1st order light beams from each point on the brancher 13 to corresponding positions on the rear focal plane of the objective lens 33 (pupil plane P0). Specifically, the lens 30 condenses −1st order diffracted light from each point on the brancher 13 to a position symmetric with that for +1st order diffracted light across the optical axis of the illumination optical system 14.

Illumination light that has passed through the lens 30 enters the filter 31. For example, the filter 31 is an excitation filter, and has such characteristics that light in a wavelength band including the excitation wavelength of a fluorescent substance included in the sample X selectively passes through the filter 31. The filter 31 blocks light having the same wavelength as the wavelength of fluorescence emitted from the sample excited by exciting light from the light source 20. Light that has passed through the filter 31 enters the dichroic mirror 32. The dichroic mirror 32 has such characteristics that light in the wavelength band including the excitation wavelength of the fluorescent substance included in the sample X is reflected and light (for example, fluorescence) in a predetermined wavelength band among light beams from the sample X passes through the dichroic mirror 32. Light from the filter 31 is reflected by the dichroic mirror 32 to enter the objective lens 33.

The objective lens 33 forms a plane optically conjugate with the intermediate image plane 28a, that is, a plane optically conjugate with the brancher 13, on the sample. Specifically, the objective lens 33 forms structured illumination on the sample. +1st order diffracted light is condensed at a position away from the optical axis 14a on the pupil plane P0 of the objective lens 33. −1st order diffracted light is condensed at a position symmetric with that for +1st order diffracted light across the optical axis 14a on the pupil plane P0. 1st order diffracted light enters a focal plane at an angle corresponding to the numerical aperture (NA) of the objective lens 33.

When observed, the sample X is disposed such that a portion to be observed is disposed to face a front focal plane of the objective lens 33. In the 2D-SIM mode, for example, interference fringes are formed on the sample X by interference between +1st order diffracted light and −1st order diffracted light. For example, the interference fringes have a periodic distribution of light intensity in a direction perpendicular to the optical axis 14a of the illumination optical system 14. The interference fringes are in a pattern in which bright parts and dark parts are periodically arranged in a direction corresponding to the periodic direction of the brancher 13. At parts of the sample X on which bright parts of the interference fringes are arranged, fluorescent substances are excited to emit fluorescence. An image of the fluorescence is a modulated image (moire image) of the interference fringes formed by the illumination optical system 14 and the distribution of the fluorescent substances in the sample X (fluorescent density distribution). The imaging device 3 acquires the modulated image.

The imaging device 3 includes the imaging optical system 35 and an imaging element 36. The imaging optical system 35 includes the objective lens 33, the dichroic mirror 32, a filter 37, and a lens 38. The imaging optical system 35 shares the objective lens 33 and the dichroic mirror 32 with the illumination optical system 14. Light from the sample X (hereinafter referred to as "observation light") enters the objective lens 33 to be collimated, and passes through the dichroic mirror 32 to enter the filter 37.

The filter 37 is a fluorescent filter. The filter 37 has such characteristics that light (for example, fluorescence) in a predetermined wavelength band among observation light from the sample X selectively passes through the filter 37. For example, the filter 37 blocks illumination light reflected by the sample X, outside light, and stray light. Light that has passed through the filter 37 enters the lens 38. The lens 38 forms a plane (image plane) optically conjugate with a front focal plane (object plane) of the objective lens 33. An image (including moire image) by fluorescence from the sample X is formed on the image plane.

For example, the imaging element 36 includes a two-dimensional imaging sensor, such as a CCD imaging sensor and a CMOS imaging sensor. For example, the imaging element 36 has a plurality of pixels arranged in a two-dimensional manner, and has a structure in which a photoelectric conversion element such as a photodiode is disposed for each pixel. For example, the imaging element 36 reads, by a readout circuit, electric charges generated by the photoelectric conversion element due to the irradiation of observation light. The imaging element 36 converts the read electric charges into digital data (for example, 8-bit gray-scale value), and outputs image data in a digital format in which the positions of pixels and gray-scale values are associated with each other. Electric charge accumulation time per frame by the imaging element is, for example, about 100 milliseconds or about 200 milliseconds.

The structured illumination microscope 1 includes a demodulator 40 that performs demodulation processing by using images acquired by the imaging device 3. For example, the demodulator 40 is provided in the control device 4, but may be provided separately from the control device 4. For example, in demodulation processing in the 2D-SIM mode, modulated images (including moire images) in nine states obtained by a combination of three states with different periodic directions of interference fringes and three states with different phases of interference fringes are used. Examples of the demodulation processing are described later.

The brancher 13 according to the present embodiment includes a light modulator (illustrated in FIG. 2 and other figures) that modulates illumination light, and the light modulator is able to change the state (periodic direction and phase) of interference fringes. While controlling the light modulator in the brancher 13 to switch interference fringes to a plurality of states, the controller 15 controls the imaging device 3 to acquire modulated images of the sample X in the states of the interference fringes. The imaging element 36 takes the modulated images formed by the imaging optical system 35 to generate modulated images.

Figure 2A:
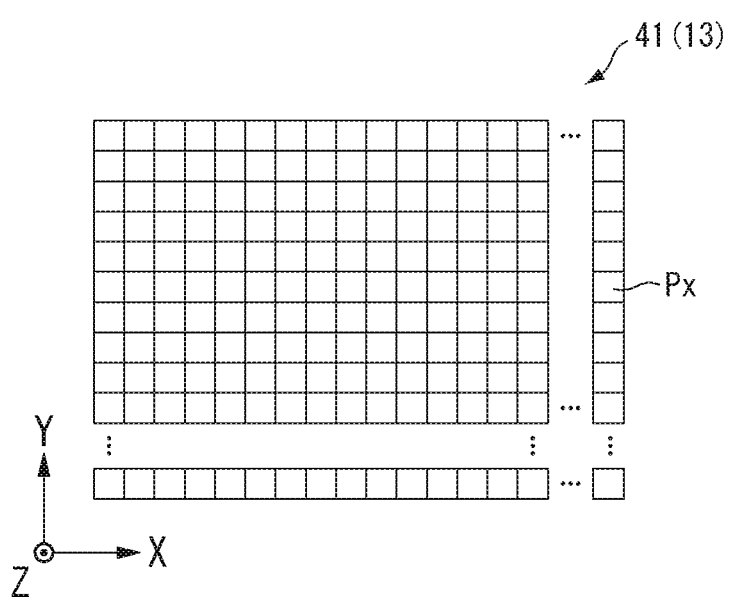
FIGS. 2A and 2B include diagrams illustrating a light modulator in a brancher.
Figure 2B:
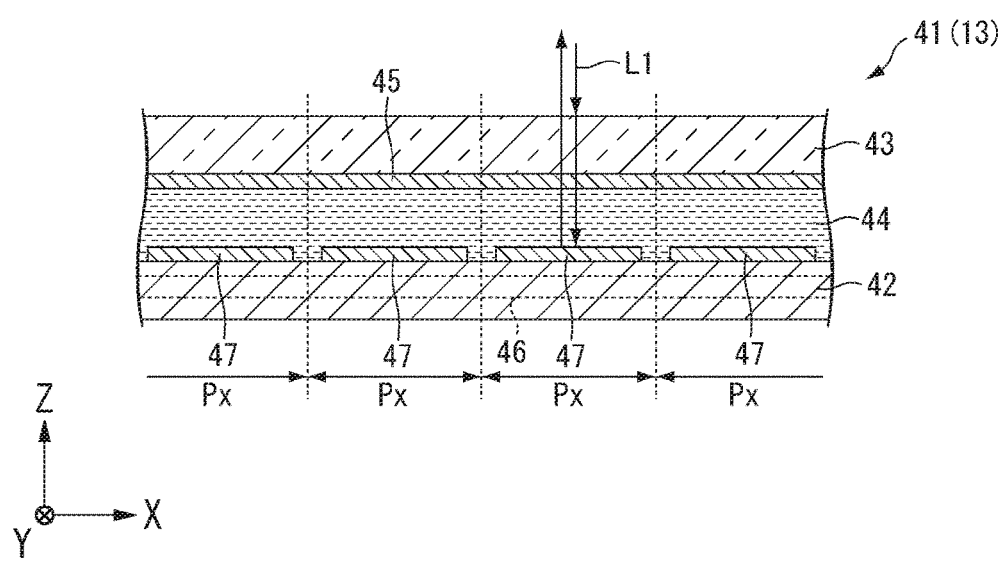

FIG. 2A is a plan view illustrating a light modulator 41 in the brancher 13. FIG. 2B is a cross-sectional view illustrating the light modulator 41. The light modulator has a plurality of pixels Px arranged in a two-dimensional manner. The pixels Px are disposed in plurality in each of the X direction (for example, horizontal scanning direction) and the Y direction (for example, vertical scanning direction). The light modulator 41 is able to modulate illumination light for each pixel Px.

As illustrated in FIG. 2B, the light modulator 41 includes a first substrate 42, a second substrate 43 opposed to the first substrate 42, and a liquid crystal layer 44 sandwiched between the first substrate 42 and the second substrate 43. In the present embodiment, the light modulator 41 is a reflective element. Illumination light L1 from the light source 11 enters the second substrate 43, passes through the second substrate, and enters the liquid crystal layer 44. Illumination light that has passed through the liquid crystal layer 44 is reflected by the first substrate 42, passes through the liquid crystal layer 44, and exits from the second substrate 43. The light modulator 41 may be a transmissive element.

The second substrate 43 is obtained by forming a counter electrode 45 on a substrate having translucency such as glass. For example, the counter electrode 45 is formed from indium tin oxide (ITO), and has translucency. The counter electrode 45 is formed over the pixels Px, and is common to the pixels. For example, the counter electrode 45 is held at a reference potential.

The first substrate 42 is obtained by forming an element layer 46 and pixel electrodes 47 on a substrate made of silicon, for example. The pixel electrodes 47 are provided for the respective pixels Px. For example, each of the pixel electrodes 47 is a reflection electrode formed from metal material. For example, the element layer 46 has an active matrix circuit including switching elements such as TFTs and wiring such as scanning lines and signal lines. For example, the active matrix circuit is able to apply voltage to each of the pixel electrodes 47 based on a drive signal (for example, image data) supplied from the controller 15. The pixel electrodes 47 are applied with positive voltage (for example, +V1) or negative voltage (−V1) with respect to the reference potential by the active matrix circuit.

The liquid crystal layer 44 includes ferroelectric liquid crystals (FLC). Ferroelectric liquid crystals have a layered structure in which liquid crystal molecules have spontaneous polarization. For each pixel Px, the liquid crystal layer 44 is applied with an electric field corresponding to voltage of the pixel electrode 47 with respect to the counter electrode 45. Ferroelectric liquid crystals are distributed in parallel within the XY plane, and the oriented state thereof is changed between the oriented state corresponding to positive voltage and the oriented state corresponding to negative voltage in accordance with the applied electric field. The liquid crystal molecules have anisotropy of refractive index, and give different phases to a component of the incident light (illumination light) that is polarized in a direction parallel to the optical axis (for example, fast axis) and a component of the incident light that is polarized in a direction perpendicular to the optical axis. The light modulator 41 is a reflective SLM, and the incident light passes through the liquid crystal layer 44 twice, that is, in an outward path from the second substrate toward the first substrate and in a return path toward the second substrate after being reflected by the first substrate. Thus, the phase given to the incident light by the liquid crystal layer 44 is twice as large as that with a transmissive SLM. A phase $\Delta\varphi$ given to the incident light by the liquid crystal layer 44 is expressed by $\Delta\varphi=2\pi\Delta n(2d)/\lambda$, where $\lambda$ represents the wavelength of the incident light, $\Delta n$ represents a refractive index difference between the direction of fast axis and the direction of slow axis, and d represents the thickness of the liquid crystal layer 44. By selecting the thickness d of the liquid crystal layer 44 and the refractive index difference $\Delta n$ (liquid crystal material) so as to obtain the phase difference of $\Delta\varphi=\pi$, the light modulator 41 serves as a ½ wavelength plate for the incident light.

The light modulator 41 is able to switch the direction of the optical axis between two states for each pixel by selecting the electric field applied to the liquid crystal layer 44 in each pixel. The light modulator 41 is useable as an amplitude or phase diffraction grating by switching the phase given to the incident light for each pixel. The light modulator 41 uses ferroelectric liquid crystals, and hence, for example, as compared with the use of nematic liquid crystals, the rate of change in refractive index in response to change in voltage is able to be improved. For example, the light modulator 41 is able to switch the direction of the optical axis between two states in units of microseconds.

Figure 3A:
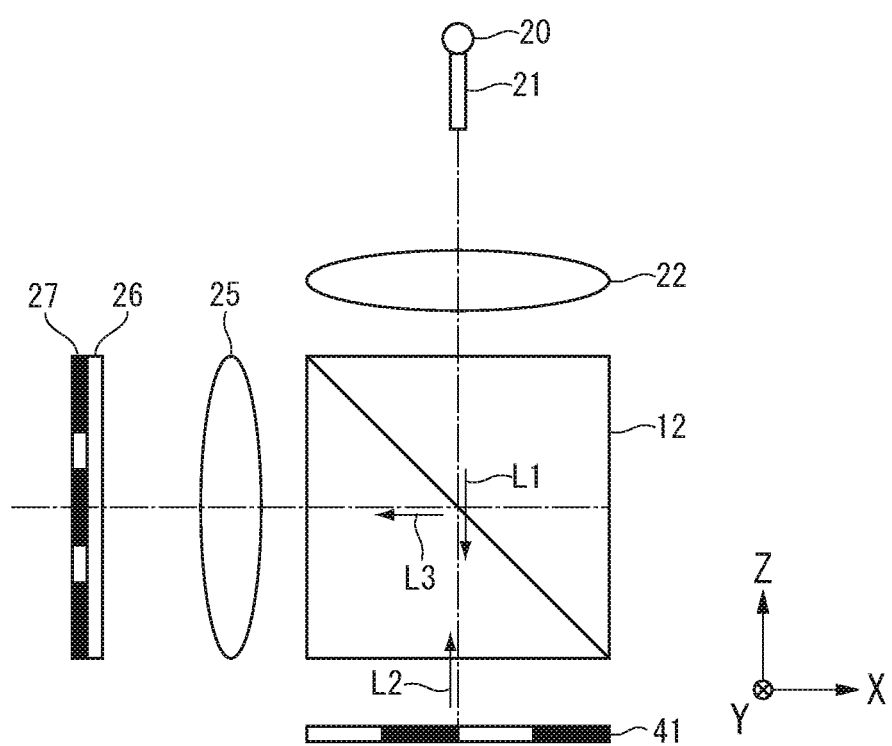
FIGS. 3A and 3B include explanatory diagrams illustrating modulation in each pixel in the light modulator.

FIG. 3A is a diagram illustrating an optical path of illumination light emitted from the collimator 22 toward the lens 25 through the light modulator 41. In FIG. 3A, reference sign L1 represents illumination light entering the light modulator 41, and reference sign L2 represents illumination light that has passed through the outward path and the return path in the light modulator 41. Reference sign L3 represents illumination light reflected by the polarization separation film 12a in the polarization separation element 12. In this case, the polarization direction of the illumination light L1 is changed by the polarization separation film 12a to a direction D1 in FIG. 3B.

Figure 3B:
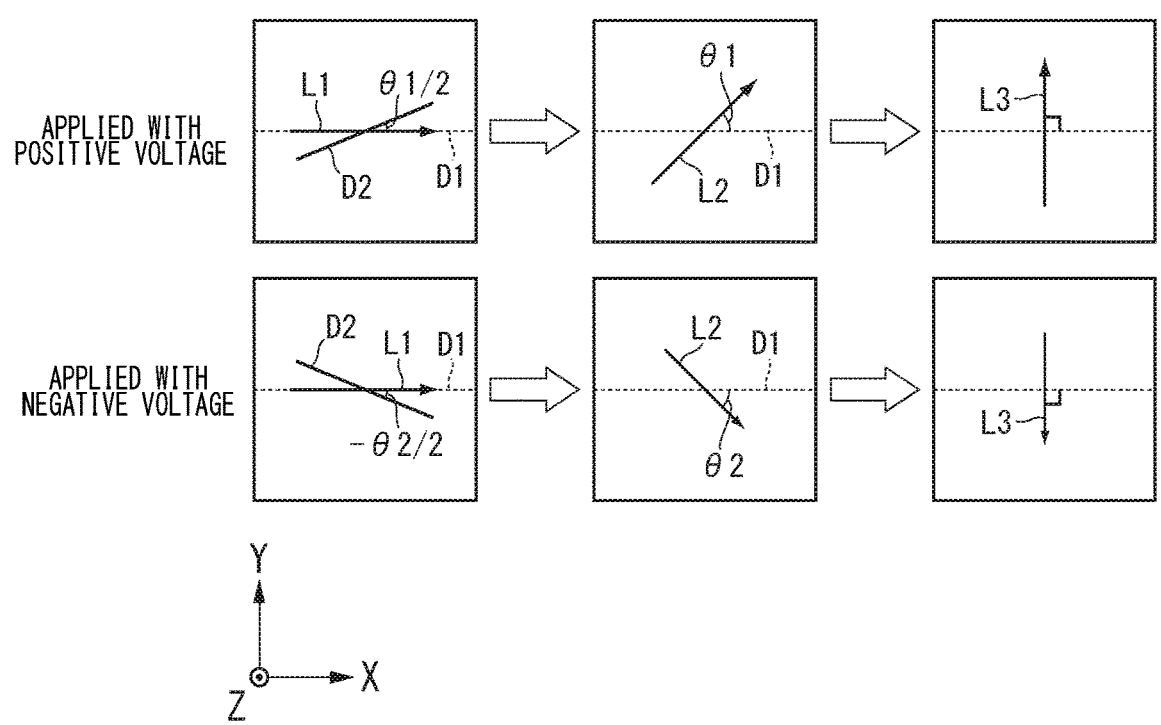

FIG. 3B is a conceptual diagram illustrating modulation in each pixel Px in the light modulator 41. Reference sign D2 represents a director (long axis direction) of liquid crystal molecules. It is desired to place the light modulator 41 such that the cone center of liquid crystal molecules is shifted from the polarization direction of the illumination light L1 by several degrees. In this manner, for example, it is easy to secure sufficient intensity of 0th order diffracted light used in the 3D-SIM mode.

The director D2 of liquid crystal molecules applied with positive voltage is a direction rotated by an angle of θ1/2 [rad] in the counterclockwise direction from the polarization direction D1 of the illumination light L1. The director D2 of liquid crystal molecules applied with negative voltage is a direction rotated by an angle of θ2/2 [rad] in the clockwise direction from the polarization direction of the illumination light L1.

In a pixel applied with positive voltage, the light modulator 41 rotates the polarization direction of the illumination light by an angle of θ1 in the counterclockwise direction. In a pixel applied with negative voltage, the light modulator 41 rotates the polarization direction of the illumination light by an angle of θ2 in the clockwise direction. In this case, the illumination light L2 emitted from the light modulator 41 is separated into a component polarized in the X direction and a component polarized in the Y direction. In the component polarized in the Y direction, the phase difference between a light beam entering a pixel applied with positive voltage and a light beam entering a pixel applied with negative voltage is π [rad]. The light modulator 41 serves as a diffraction grating having a phase difference of π [rad] for the component polarized in the Y direction, and diffracted light is generated. In the component polarized in the X direction, the phase difference between a light beam entering a pixel applied with positive voltage and a light beam entering a pixel applied with negative voltage is 0 [rad]. In this case, only 0th order diffracted light is generated as diffracted light.

In the illumination light L2 that has been diffracted by the light modulator 41 to enter the polarization separation element 12, S-polarized light with respect to the polarization separation film 12a (for example, component polarized in the Y direction) is reflected by the polarization separation film 12a and directed to the lens 25. The component polarized in the X direction (P-polarized light) passes through the polarization separation film 12a, and is excluded from the optical path directed to the sample X. In other words, the illumination light L3 is light obtained by extracting the component polarized in the Y direction from the illumination light L2, and the phase is shifted by π between the case where light passes through a pixel applied with positive voltage and the case where light passes through a pixel applied with negative voltage.

The diffraction direction and the phase of diffracted light to be generated by the light modulator 41 are determined by a distribution of pixels Px applied with positive voltage and pixels Px applied with negative voltage among the pixels Px. In the following description, the distribution of pixels Px applied with positive voltage and pixels Px applied with negative voltage is referred to as "voltage pattern (voltage distribution)". The controller 15 illustrated in FIG. 1 supplies pattern data to the light modulator 41 to control the light modulator 41 to form a voltage pattern corresponding to the pattern data, thereby controlling the diffraction direction and the phase of diffracted light to be generated by the light modulator 41. For example, the pattern data is bitmap data in which a gray-scale value (for example, 0 or 1) indicating whether the voltage applied to a pixel Px is positive voltage or negative voltage and the position of the pixel Px are associated with each other.

In the SLM that modulates light due to electric field effect, internal ions of ferroelectric liquid crystals are attracted in one direction due to the bias in DC component of voltage applied for the modulation, which may cause image burn-in.

Figure 4:
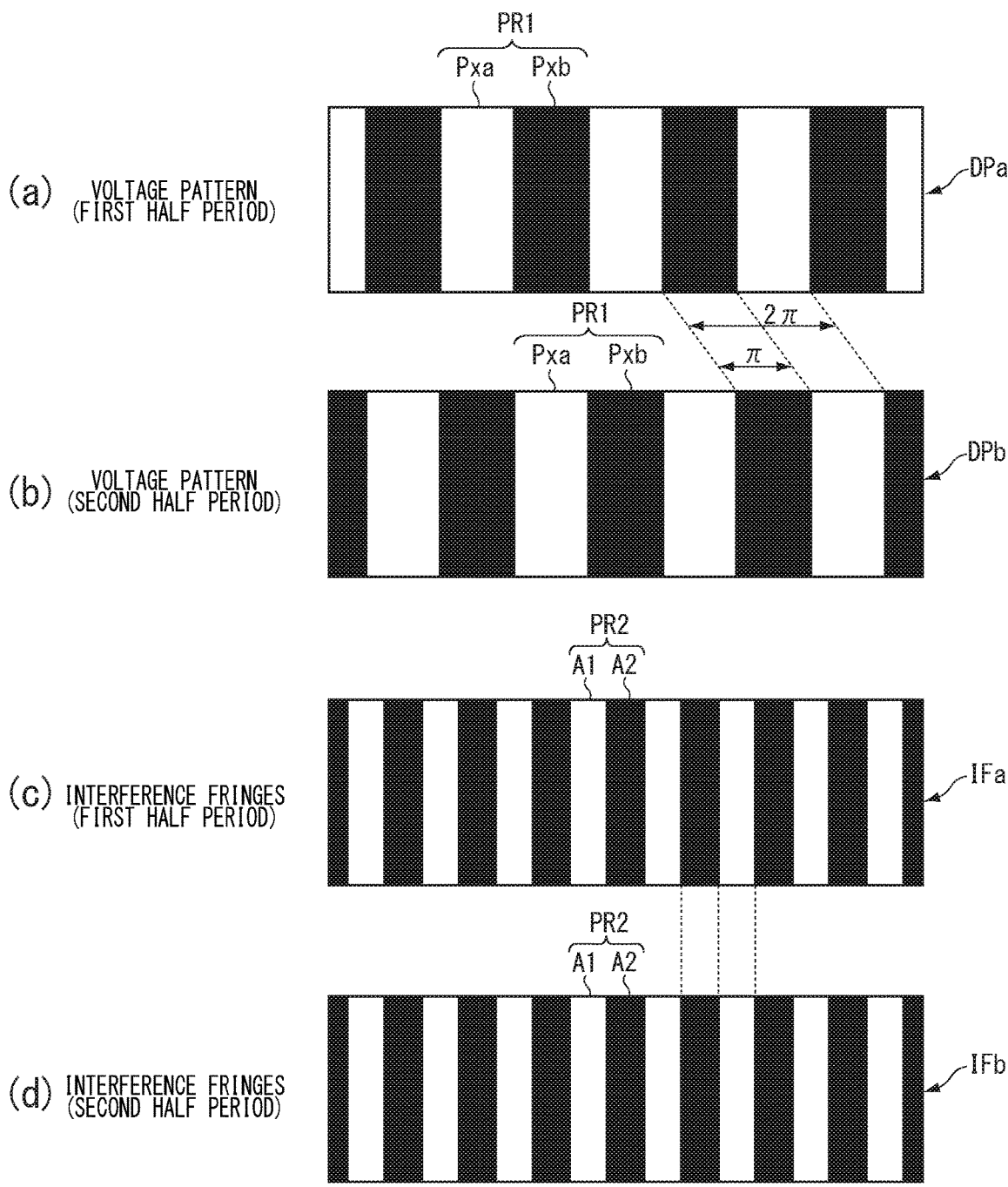
FIG. 4 includes conceptual diagrams illustrating voltage patterns and interference fringes in a 2D-SIM mode.

FIGS. 4A and 4B are diagrams illustrating voltage patterns. FIGS. 4C and 4D are conceptual diagrams illustrating interference fringes formed by +1st order diffracted light and −1st order diffracted light. As illustrated in (a) of FIG. 4, for example, the light modulator 41 forms a voltage pattern DPa in the first half period in one frame for imaging. For example, in the voltage pattern DPa, pixel groups Pxa applied with positive voltage and pixel groups Pxb applied with negative voltage are arranged in the X direction. The voltage pattern DPa is a pattern in which unit structures PR1, each of which is a pair of the pixel group Pxa and the pixel group Pxb, are periodically arranged. Interference fringes IFa illustrated in (c) of FIG. 4 represent interference fringes formed by interference between +1st order diffracted light and −1st order diffracted light among diffracted light beams that are diffracted by the light modulator 41 applied with the voltage pattern DPa illustrated in (a) of FIG. 4. The interference fringes IFa are a pattern in which unit structures PR2, each of which includes a bright part A1 and a dark part A2, are periodically arranged.

As illustrated in (b) of FIG. 4, for example, the light modulator 41 forms a voltage pattern DPb, which is a voltage pattern obtained by inverting the voltage pattern in the first half period, in the second half period in one frame for imaging. In other words, the voltage pattern DPb corresponds to a pattern obtained by inverting the positive voltage and the negative voltage in the voltage pattern DPa. In the voltage pattern DPb having periodicity, the phase of the unit structure PR1 is shifted from the voltage pattern DPa by π (½ period). Interference fringes IFb illustrated in (d) of FIG. 4 represent interference fringes formed by interference between +1st order diffracted light and −1st order diffracted light among diffracted light beams that are diffracted by the light modulator 41 applied with the voltage pattern DPb illustrated in (b) of FIG. 4. The interference fringes IFb are interference fringes in which the phase is shifted from the interference fringes IFa by 2π (1 period). Thus, at the positions of the bright parts A1 of the interference fringes IFa in the first half period in one frame, the bright parts A1 of the interference fringes IFb in the second half period are disposed, and at the positions of the dark parts A2 of the interference fringes IFa in the first half period, the dark parts A2 of the interference fringes IFb in the second half period are disposed.

Specifically, the voltage pattern DPa (see (a) of FIG. 4) is applied to the light modulator 41 to form the interference fringes IFa (see (c) of FIG. 4), and the voltage pattern DPb (see (b) of FIG. 4) is applied to the light modulator 41 to form the interference fringes IFb (see (d) of FIG. 4) in which the phase is shifted from the interference fringes IFa (see (c) of FIG. 4) by 2π (1 period). In other words, the same interference fringes are able to be formed irrespective of whether the voltage pattern DPa or the voltage pattern DPb is applied to the light modulator 41. In the light modulator 41, on the other hand, the direction of the electric field applied to the liquid crystal layer 44 is inverted between the case where the voltage pattern DPa is applied and the case where the voltage pattern DPb is applied, and hence the occurrence of image burn-in is suppressed. Consequently, the sample X is able to be illuminated with interference fringes having the same phase in the first half period and the second half period in one frame while the occurrence of image burn-in in the light modulator 41 is suppressed.

In one frame period during which the imaging is performed by the imaging device 3, the controller 15 only needs to apply a first voltage pattern and a second voltage pattern obtained by inverting the first voltage pattern to at least some of the pixel electrodes 47. For example, pixel electrodes 47 in which voltage patterns applied in one frame period are inverted may be a part of the pixel electrodes 47 or all of the pixel electrodes 47 (the same applies hereinafter). For example, the controller 15 may invert voltage patterns in one frame period for a half of the pixel electrodes 47, and invert voltage patterns in another frame period for the remaining half of the pixel electrodes 47.

Figure 5:
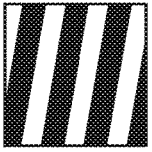
FIG. 5 is a diagram illustrating an example of conditions of interference fringes.

Next, referring to FIG. 5 to FIG. 9, an observation method in the 2D-SIM mode is described based on the operation of the structured illumination microscope 1. FIG. 5 is a diagram illustrating an example of conditions of interference fringes. For example, the structured illumination microscope 1 switches the periodic direction of interference fringes to three directions of a first direction, a second direction, and a third direction. For example, the first direction is a direction freely selected, the second direction is a direction of 120° in the counterclockwise direction from the first direction, and the third direction is a direction of 120° in the counterclockwise direction from the second direction (−120° in the clockwise direction from the first direction).

The structured illumination microscope 1 switches the phase to three patterns under each of the conditions of the periodic direction of interference fringes. For example, the structured illumination microscope 1 switches the phase of interference fringes to three patterns of 0 (desired reference phase), a phase shifted from the reference phase by $2\pi/3$, and a phase shifted from the reference phase by $4\pi/3$ in the state in which the periodic direction of the interference fringes is set to the first direction.

Figure 6:
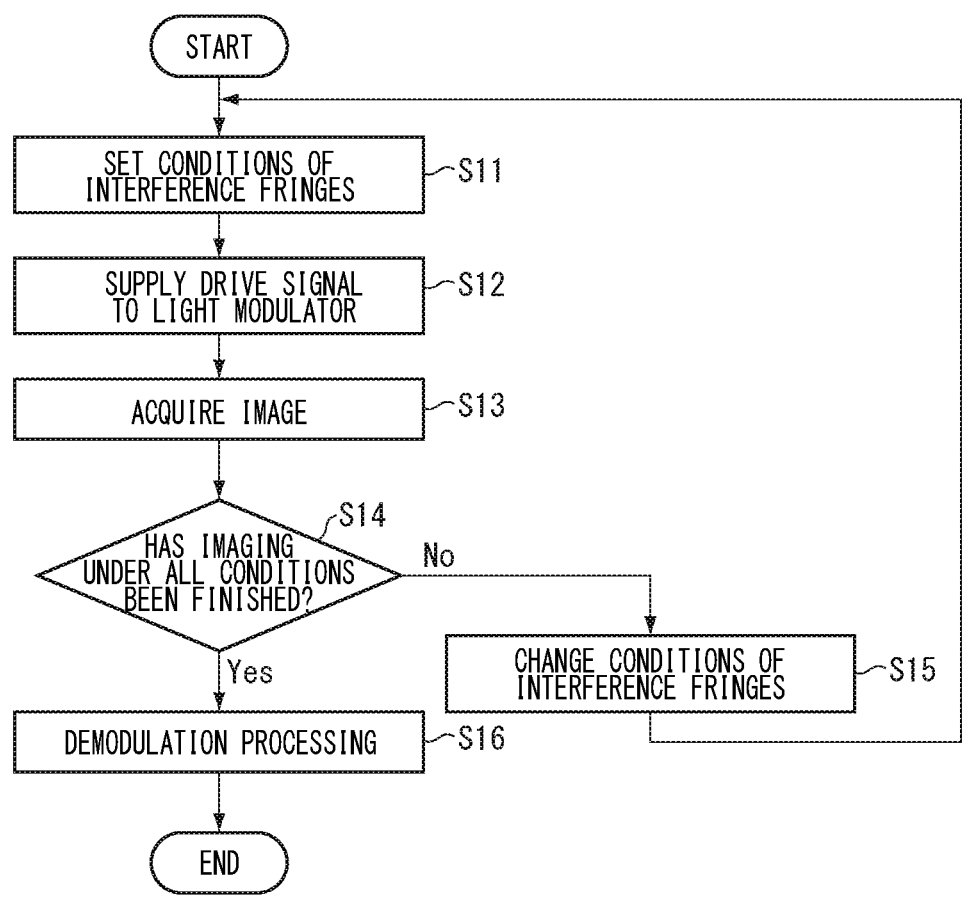
FIG. 6 is a diagram illustrating operation of the structured illumination microscope in the 2D-SIM mode.

FIG. 6 is a flowchart illustrating the operation of the structured illumination microscope 1 in the 2D-SIM mode (see FIG. 1 to FIG. 3 for the components in the structured illumination microscope 1). At Step S11, the controller 15 in the control device 4 sets conditions (phase, direction) of interference fringes. For example, the controller 15 sets the periodic direction of interference fringes to the first direction, and sets the phase of the interference fringes to 0. At Step S12, the controller 15 supplies a drive signal corresponding to the conditions of the interference fringes set at Step S11 to the light modulator 41. The light modulator 41 applies voltage to each pixel in accordance with the drive signal to form a voltage pattern, and the structured illumination device 2 forms interference fringes corresponding to the voltage pattern on the sample X. At Step S13, the controller 15 controls the imaging device 3 to take an image of the sample X illuminated with the interference fringes.

At Step S14, the controller 15 determines whether the imaging under all the conditions of the interference fringes has been finished. When the controller 15 determines that the imaging under at least one of the intended conditions (for example, nine conditions illustrated in FIG. 5) has not been finished (No at Step S14), the controller 15 changes the condition of the interference fringes at Step S15. After the end of the processing at Step S15, the controller 15 repeats the processing from Step S12 to Step S14 to take images of the sample X under the intended conditions.

For example, the controller 15 sets the periodic direction of interference fringes to the first direction, and switches the phase of the interference fringes to 0, $2\pi/3$, and $4\pi/3$ to acquire three images related to the first direction. For example, the controller 15 sets the periodic direction of interference fringes to the second direction, and switches the phase of the interference fringes to 0, $2\pi/3$, and $4\pi/3$ to acquire three images related to the second direction. For example, the controller 15 sets the periodic direction of interference fringes to the third direction, and switches the phase of the interference fringes to 0, $2\pi/3$, and $4\pi/3$ to acquire three images related to the third direction. The conditions for interference fringes may be set in any order.

When it is determined that the imaging under all the intended conditions has been completed (Yes at Step S14), the controller 15 controls the demodulator 40 to execute demodulation processing at Step S16. The demodulator 40 uses images taken by the imaging device 3 under the conditions to execute demodulation processing, and forms data on a super-resolution image. For example, the control device 4 stores the data on the super-resolution image in a storage device (not shown). For example, the control device 4 displays the super-resolution image on the display device 5.

FIG. 7 includes conceptual diagrams illustrating an example of voltage patterns used to acquire three images related to the first direction. In each voltage pattern illustrated in FIG. 7, parts corresponding to pixels applied with positive voltage are illustrated in white, and parts corresponding to pixels applied with negative voltage are illustrated in black.

Figure 7A:
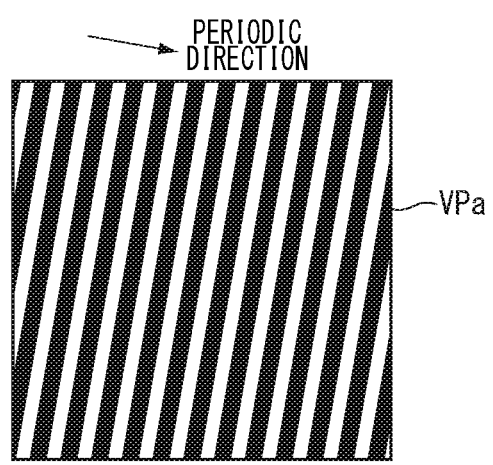
FIGS. 7A to 7F include conceptual diagrams illustrating examples of voltage patterns used to form phases of interference fringes.
Figure 7B:
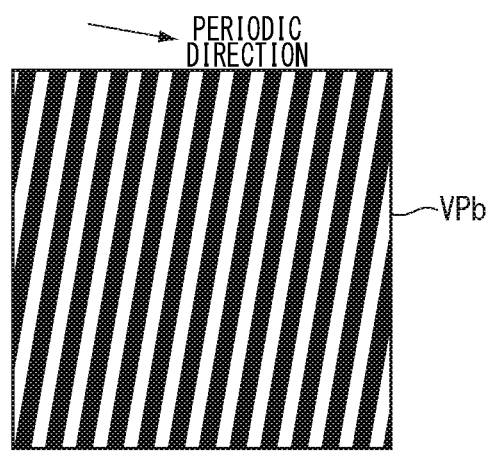

A voltage pattern VPa in FIG. 7A and a voltage pattern VPb in FIG. 7B are voltage patterns used for conditions where the phase of interference fringes is 0, and, for example, used in the first half period in one frame for imaging. The voltage pattern VPb is a pattern obtained by inverting the voltage pattern VPa, and, for example, used in the second half period in one frame for imaging. A voltage pattern VPc in FIG. 7C and a voltage pattern VPd in FIG. 7D are voltage patterns used for conditions where the phase of interference fringes is $2\pi/3$. For example, VPc is used in the first half period in one frame. The voltage pattern VPd is a pattern obtained by inverting the voltage pattern VPc, and, for example, used in the second half period in one frame for imaging. A voltage pattern VPe in FIG. 7E and a voltage pattern VPf in FIG. 7F are voltage patterns used for conditions where the phase of interference fringes is $4\pi/3$, and, for example, used in the first half period in one frame for imaging. The voltage pattern VPf is a pattern obtained by inverting the voltage pattern VPe, and, for example, used in the second half period in one frame for imaging.

Figure 8:
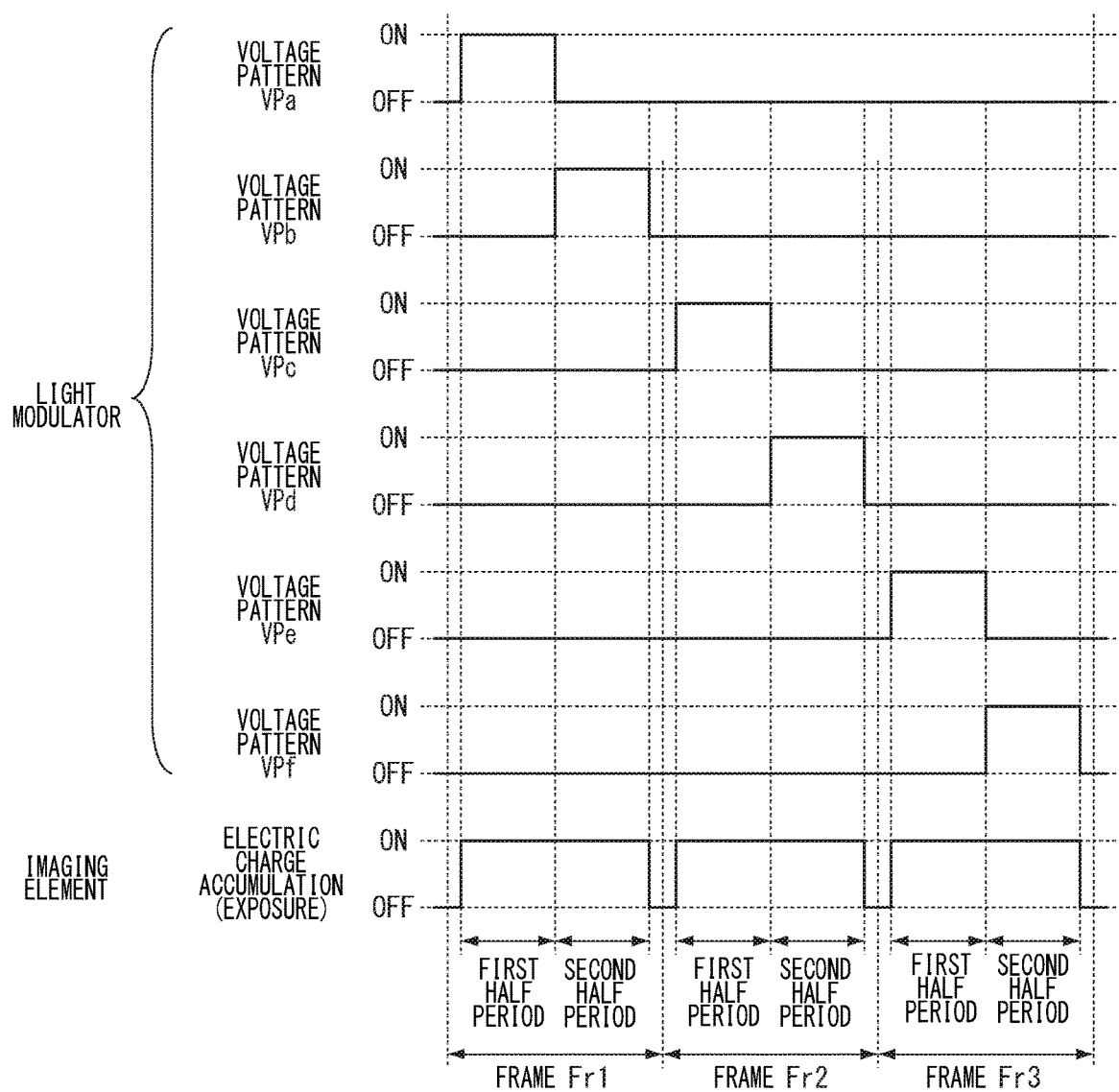
FIG. 8 is a timing chart illustrating operations of the light modulator and an imaging element.

FIG. 8 is a timing chart illustrating operations of the light modulator 41 and the imaging element 36 for acquiring three images related to the first direction. Before the first half period in a frame Fr1 is started, the controller 15 supplies a drive signal (for example, bitmap data) indicating the voltage pattern VPa to the light modulator 41. In the first half period in the frame Fr1, the light modulator 41 applies a positive potential (for example, +V1) and a negative potential (for example, −V1) to the pixel electrodes 47 such that the distribution of voltage values of the pixel electrodes 47 becomes the voltage pattern VPa. Before the second half period in the frame Fr1 is started, the controller 15 supplies a drive signal (for example, bitmap data) indicating the voltage pattern VPb to the light modulator 41. In the second half period in the frame Fr1, the light modulator 41 applies the potential (for example, +V1 or −V1) to each of the pixel electrodes 47 such that the distribution of voltage values of the pixel electrodes 47 becomes the voltage pattern VPb.

In the first half period in the frame Fr1, an electric field corresponding to the drive signal is applied to the liquid crystal layer 44 in the light modulator 41, so that the bias in electric charges may occur between the first substrate 42 side and the second substrate 43 side. In the second half period in the frame Fr1, however, an electric field obtained by inverting the electric field in the first half period is applied to the liquid crystal layer 44 in the light modulator 41 in response to the drive signal, and hence at least a part of the bias in electric charges (for example, image burn-in) generated in the first half period is eliminated.

As illustrated in FIG. 4, the voltage patterns formed by the light modulator 41 are inverted from each other between the first half period and the second half period, but the phases of interference fringes formed on the sample X are aligned with each other in the first half period and the second half period (the same phase). The controller 15 controls the imaging element 36 such that electric charges due to light from the sample X are accumulated in the photoelectric conversion element in each pixel of the imaging element 36 over the first half period and the second half period in the frame Fr1. In this manner, the structured illumination microscope 1 is able to suppress the occurrence of image burn-in in the light modulator 41 by using a part of the exposure period of the imaging element 36.

Also in the frame Fr2, the controller 15 similarly supplies a drive signal indicating a third voltage pattern VPc and a drive signal indicating a fourth voltage pattern VPd to the light modulator 41. In the first half period in the frame Fr2, the light modulator 41 holds the distribution of voltage values of the pixel electrodes 47 to the third voltage pattern VPc. In the second half period in the frame Fr2, the light modulator 41 holds the distribution of voltage values of the pixel electrodes 47 to the fourth voltage pattern VPd. The light modulator 41 is able to form voltage patterns in the frame Fr2 with high accuracy because at least a part of the bias in electric charges has been eliminated in the frame Fr1. The controller 15 controls the imaging element 36 such that electric charges due to light from the sample X are accumulated in the imaging element 36 over the first half period and the second half period in the frame Fr2.

Also in the frame Fr3, the controller 15 similarly supplies a drive signal indicating the fifth voltage pattern VPe and a drive signal indicating the sixth voltage pattern VPf to the light modulator 41. In the first half period of the frame Fr3, the light modulator 41 holds the distribution of voltage values of the pixel electrodes 47 to the fifth voltage pattern VPe. In the second half period in the frame Fr3, the light modulator 41 holds the distribution of voltage value of the pixel electrodes 47 to the sixth voltage pattern VPf. The light modulator 41 is able to form voltage patterns in the frame Fr3 with high accuracy because at least a part of the bias in electric charges has been eliminated in the frame Fr2. The controller 15 controls the imaging element 36 such that electric charges due to light from the sample X are accumulated in the imaging element 36 over the first half period and the second half period in the frame Fr3.

The controller 15 acquires three images in which the periodic direction of interference fringes is the first direction and the phase thereof has three patterns through the imaging in the frames Fr1 to Fr3. The controller 15 similarly acquires images also for the case where the periodic direction of interference fringes is the second direction and the case where the periodic direction of interference fringes is the third direction.

In each of the above-mentioned frames, for example, the length of the first half period is set equal to the length of the second half period. A period of time from a start point of each frame to a start point of the first half period is freely set. For example, the start point of the first half period may be substantially the same as the start point of each frame, or may be after a predetermined time from the start point of each frame. A period of time from an end point of the first half period of each frame to a start point of the second half period is freely set. For example, the start point of the second half period may be substantially the same as the end point of the first half period, or may be after a predetermined time from the end point of the first half period. The structured illumination device 2 is able to suppress the occurrence of image burn-in by inverting the voltage pattern between the first half period and the second half period in at least one frame, and may avoid inverting the voltage pattern between the first half period and the second half period in some frames.

Figure 9A:
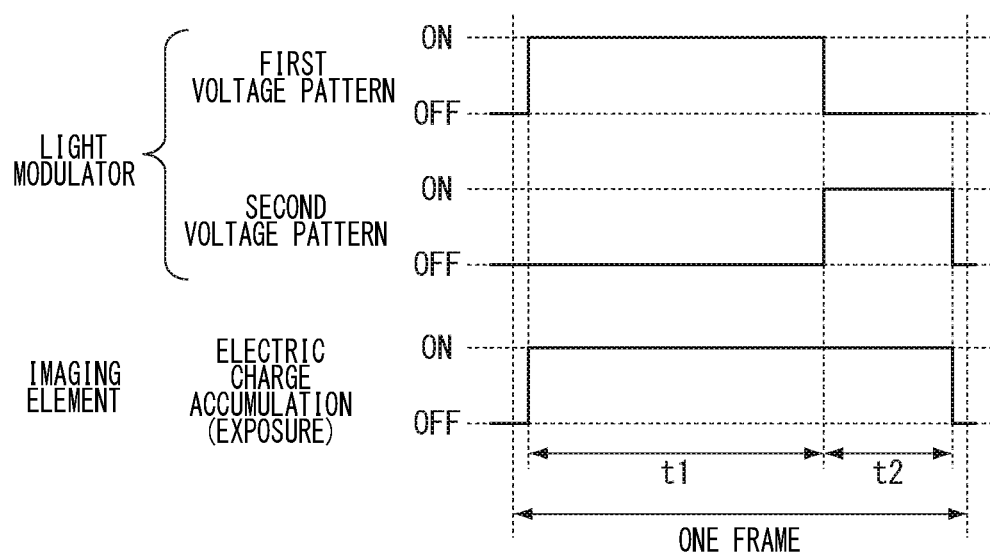
FIGS. 9A and 9B include timing charts illustrating other examples of the operations of the light modulator and the imaging element.

FIG. 9 includes timing charts illustrating other examples of the operations of the light modulator 41 and the imaging element 36. In FIG. 9A, the light modulator 41 holds the distribution of voltage values of the pixel electrodes 47 to a first voltage pattern in a first period t1 in one frame. The light modulator 41 holds the distribution of voltage values of the pixel electrodes 47 to a second voltage pattern obtained by inverting the first voltage pattern in a second period t2 in one frame. The length of the first period t1 is different from the length of the second period t2.

Also in such a case, at least a part of the bias in electric charges generated in the first period t1 is able to be resolved in the second period t2 in the light modulator 41. In the light modulator 41, electric characteristics (for example, parasitic capacitance) may differ between the first substrate 42 side and the second substrate 43 side. In such a case, the relative lengths of the first period t1 and the second period t2 may be adjusted to adjust the bias in electric charges in the light modulator 41.

Figure 9B:
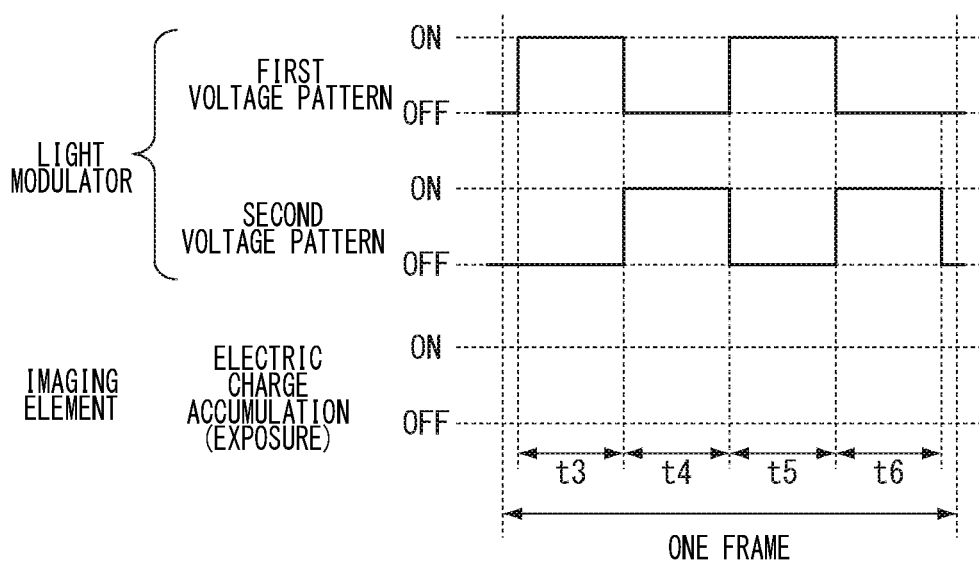

In FIG. 9B, the light modulator 41 holds the distribution of voltage values of the pixel electrodes 47 to a first voltage pattern in the third period t3 and the fifth period t5 in one frame. The light modulator 41 holds the distribution of voltage values of the pixel electrodes to a second voltage pattern obtained by inverting the first voltage pattern in the fourth period t4 and the sixth period t6 in one frame. For example, when the frame rate of the imaging element 36 is 30 fps and the refresh rate of the light modulator 41 is 120 Hz, the light modulator 41 can switch the voltage pattern four times in one frame period for imaging. In such a case, for example, the light modulator 41 may hold the distribution of voltage values of the pixel electrodes 47 to the first voltage pattern and the second voltage pattern twice alternately.

As described above, in one frame, the number of times by which the light modulator 41 holds the distribution of voltage values of the pixel electrodes 47 to the first voltage pattern may be plural. In one frame, the number of times by which the light modulator 41 holds the distribution of voltage values of the pixel electrodes 47 to the second voltage pattern may be plural and may be the same as or different from the number of times for the first voltage pattern.

Figure 10:
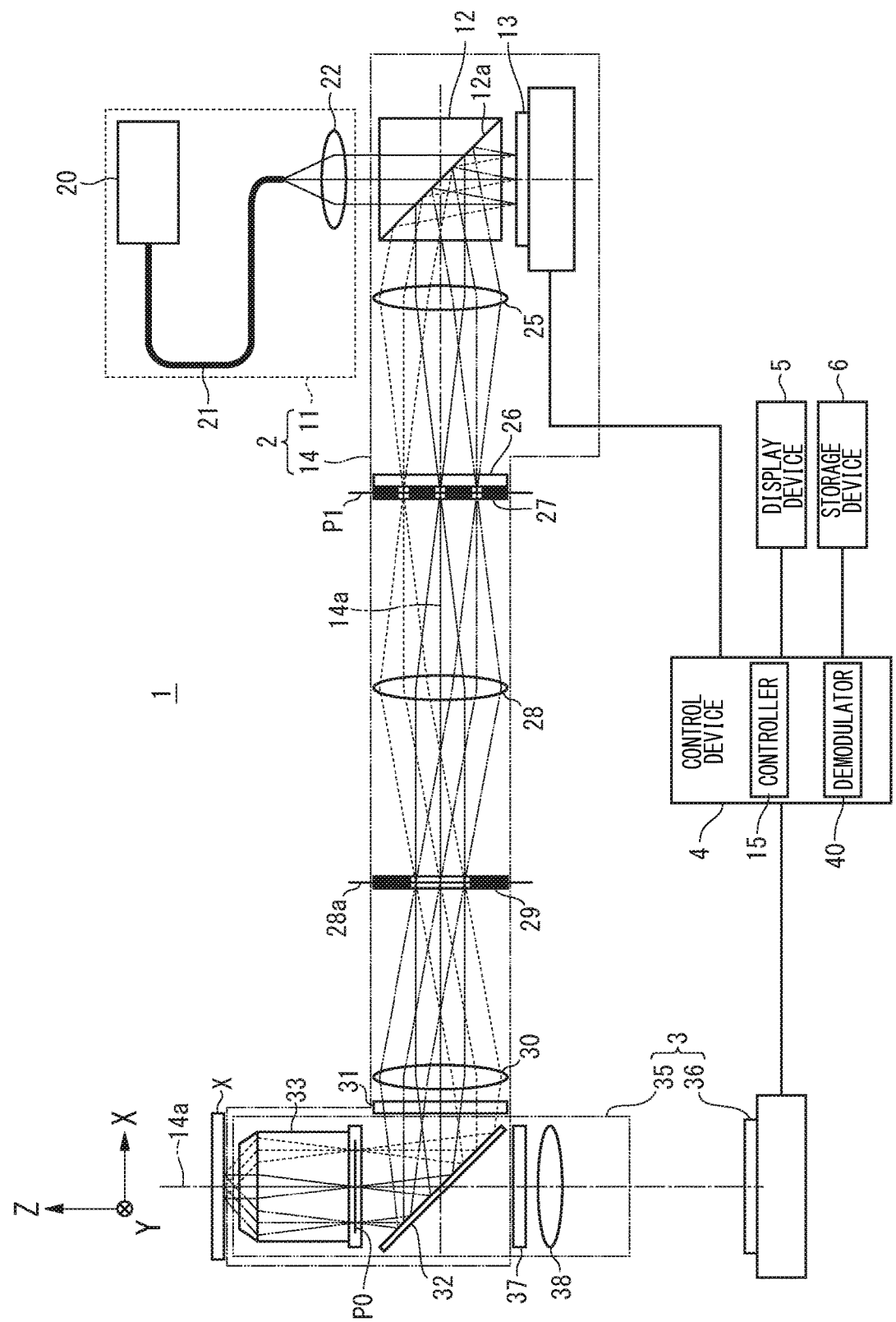
FIG. 10 is a diagram illustrating an optical path from a light source to a sample in a 3D-SIM mode.

Next, a 3D-SIM mode is described. FIG. 10 is a diagram illustrating an optical path from the light source to the sample X in the 3D-SIM mode. In FIG. 10, an optical path from the sample X to the imaging element 36 is omitted for simpler illustration, but the imaging device 3 takes images of the sample X in the same manner as in FIG. 1.

In the 3D-SIM mode, the structured illumination device 2 forms combined interference fringes obtained by combining interference fringes generated by +1st order diffracted light and −1st diffracted light, interference fringes generated by +1st order diffracted light and 0th order diffracted light, and interference fringes generated by −1st order diffracted light and 0th order diffracted light. For example, the combined interference fringes have periodic structures in two directions in total, that is, a direction within a plane perpendicular to the optical axis 14a on the light exit side of the illumination optical system 14 and a direction parallel to the optical axis 14a on the light exit side of the illumination optical system 14.

In the 3D-SIM mode, the mask 27 transmits 0th order diffracted light and 1st order diffracted light, and blocks 2nd or higher order diffracted light. For example, the mask 27 includes a shutter capable of switching the transmission and block of 0th order diffracted light, and is provided so as to transmit 0th order diffracted light in the 3D-SIM mode. When the structured illumination device 2 is used in the 3D-SIM mode, the mask 27 may be replaced with a mask having an opening at a position through which 0th order diffracted light enters.

Figure 11:
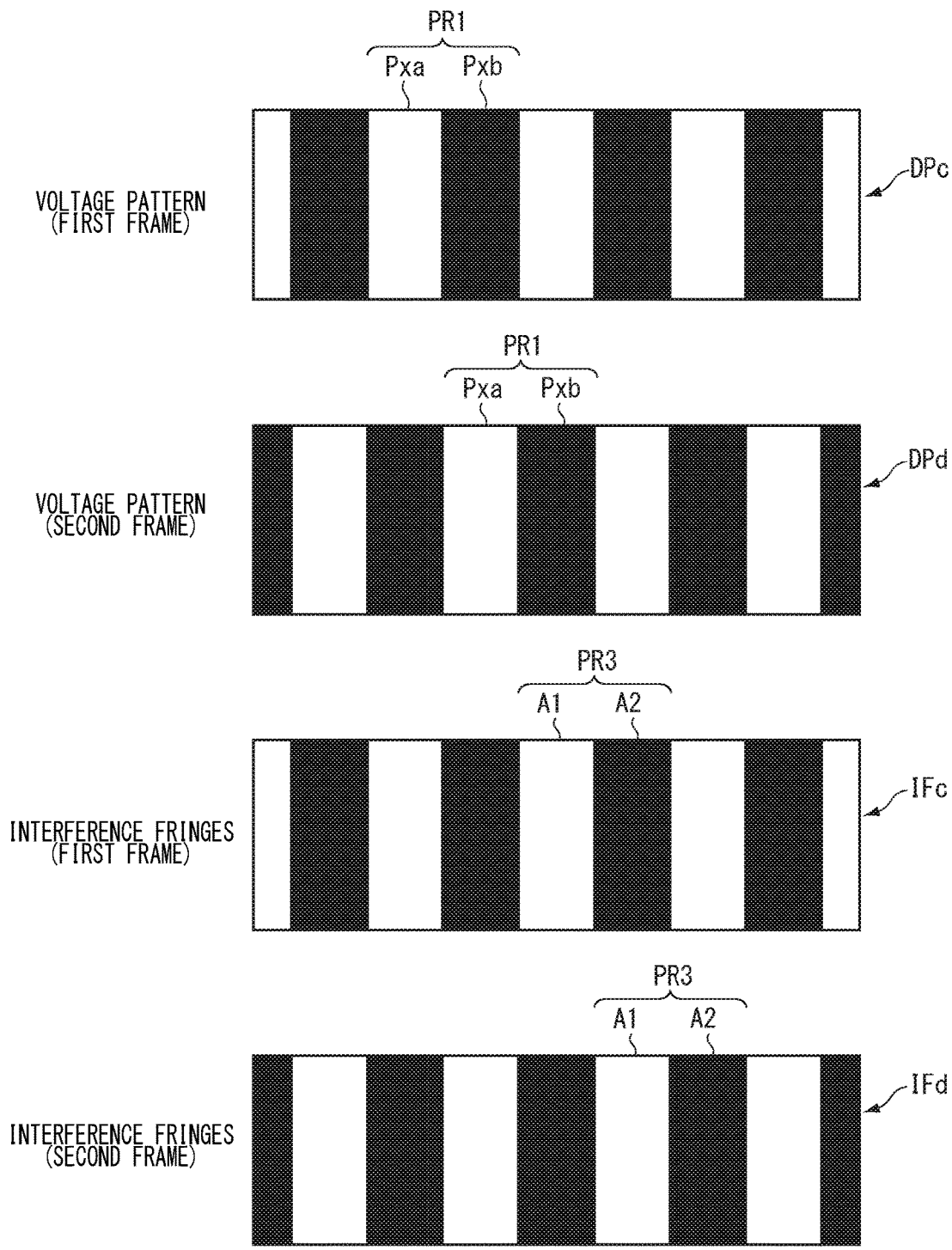
FIG. 11 is a conceptual diagram illustrating voltage patterns and interference fringes in the 3D-SIM mode.

Three interference fringes are formed in the 3D-SIM mode as described above. Of the interference fringes, interference fringes generated by +1st order diffracted light and −1st order diffracted light are the same as those in the 2D-SIM mode and descriptions thereof are omitted, and only interference fringes generated by 0th order diffracted light and +1st order diffracted light and interference fringes generated by 0th order diffracted light and −1st order diffracted light are described. Note that, in this case, the two interference fringes have completely the same phase and are thus referred to as "interference fringes generated by 0th order diffracted light and 1st order diffracted light". FIG. 11 is a conceptual diagram illustrating voltage patterns and interference fringes generated by 0th order diffracted light and 1st order diffracted light. The light modulator forms a voltage pattern DPc in the period of a first frame. The light modulator 41 forms a voltage pattern Dpd obtained by inverting the voltage pattern DPc in the period of a second frame.

In the 3D-SIM mode, interference fringes IFc are formed by interference between 0th order diffracted light and 1st order diffracted light that are diffracted by the light modulator 41 applied with the voltage pattern DPc. Interference fringes IFd formed by the voltage pattern DPd, which is a pattern obtained by inverting the voltage pattern DPc, have a phase shifted by n from the phase of the interference fringes IFc formed by the voltage pattern DPc. More specifically, the interference between 0th order diffracted light and 1st order diffracted light has a difference of orders of diffracted light of 1, and hence when the voltage pattern is inverted, the phase of formed interference fringes is shifted by n, so that the interference fringes IFd have a phase shifted by n from the phase of the interference fringes IFc.

In general, in the 3D-SIM mode, the direction of interference fringes is changed in three patterns, and the phase of interference fringes is changed in five or more patterns, so that interference fringes in fifteen or more states are formed by a combination of the direction and the phase of interference fringes, and images of the sample corresponding to the interference fringes are acquired. The structured illumination device 2 in the present embodiment changes, for each direction of interference fringes, the phase of interference fringes in even patterns (for example, 2, 4, or 6). Provided that the number of kinds of phases of interference fringes for a positive integer u is 2u, when the phase is changed by equal distances, a phase $\varphi v$ of interference fringes for an integer v from 0 to u−1 is expressed by $\varphi v = \pi v/u$. In this case, when a voltage pattern used to form interference fringes of $\varphi v$ is inverted, for example, as illustrated in FIG. 11, the phase of interference fringes is shifted by n to be $\pi(v+u)/u$, and the resultant interference fringes is able to be used as interference fringes having a phase of $\varphi v+u$.

Figure 12:
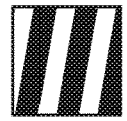
FIG. 12 is a diagram illustrating an example of conditions of interference fringes in the 3D-SIM mode.

FIG. 12 is a diagram illustrating an example of conditions of interference fringes in the 3D-SIM mode. In FIG. 12, the phase has six patterns (0, $\pi/3$, $2\pi/3$, $3\pi/3$, $4\pi/3$, $5\pi/3$), which corresponds to the above-mentioned case of u=3. Provided that $\varphi 1=0$, $\varphi 2=\pi/3$, $\varphi 3=2\pi/3$, $\varphi 4=3\pi/3$, $\varphi 5=4\pi/3$, and $\varphi 6=5\pi/3$, a voltage pattern for forming interference fringes of $\varphi 1$ and a voltage pattern for forming interference fringes of $\varphi 4$ have a reverse relation. A voltage pattern for forming interference fringes of $\varphi 2$ and a voltage pattern for forming interference fringes of $\varphi 5$ have a reverse relation. A voltage pattern for forming interference fringes of $\varphi 3$ and a voltage pattern for forming interference fringes of $\varphi 6$ have a reverse relation. For example, in the case of forming interference fringes having a phase of $\varphi 4$, the light modulator 41 forms a voltage pattern obtained by inverting the voltage pattern applied to form interference fringes having a phase of $\varphi 1$.

Now, a group including voltage patterns corresponding to $\varphi 1$, $\varphi 2$, and $\varphi 3$ is referred to as "first voltage pattern group". A group including voltage pattern corresponding to $\varphi 4$, $\varphi 5$, and $\varphi 6$ is referred to as "second voltage pattern group". The second voltage pattern group is a group including voltage patterns obtained by inverting the voltage patterns included in the first voltage pattern group. The controller 15 sets the distribution of voltage values of the pixel electrodes 47 in the light modulator 41 to voltage patterns sequentially selected from the first voltage pattern group and the second voltage pattern group. Voltage patterns included in the second voltage pattern group and voltage patterns included in the first voltage pattern group have a reverse relation, and hence the occurrence of the bias in electric charges (image burn-in) in the liquid crystal layer 44 of the light modulator 41 is suppressed.

Figure 7C:
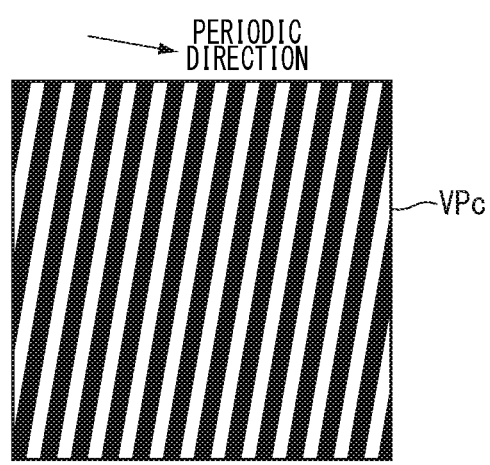
Figure 7D:
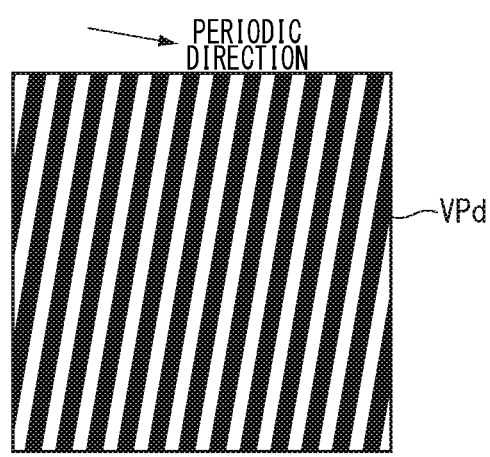
Figure 7E:
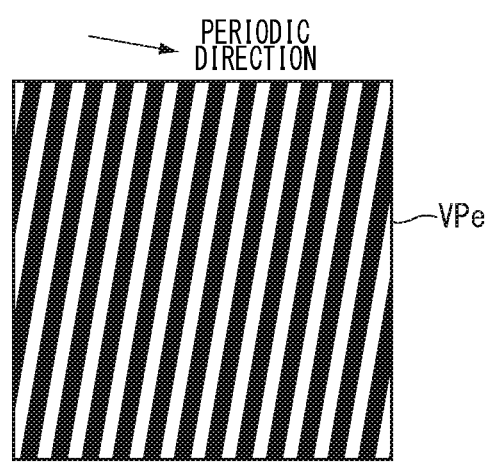
Figure 7F:
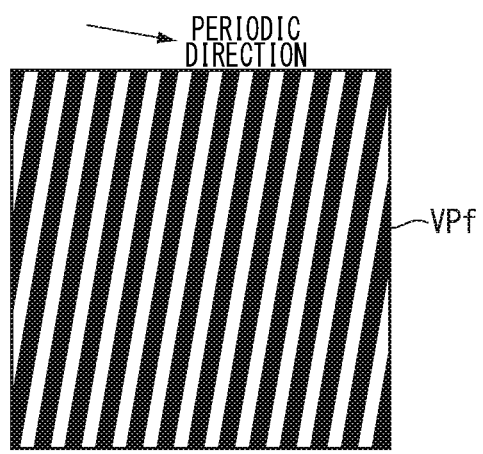

To form the interference fringes having phases of $\varphi 1$ to $\varphi 6$ as described above, for example, six kinds of voltage patterns illustrated in FIG. 7A to 7F only need to be used. For example, when the voltage pattern VPa in FIG. 7A is used for interference fringes having a phase of $\varphi 1$ (0), the voltage pattern VPb in FIG. 7B, which is a voltage pattern obtained by inverting the voltage pattern VPa, is usable to form interference fringes having a phase of $\varphi 4$ ($3\pi/3$). When the voltage pattern VPc in FIG. 7C is used to form interference fringes having a phase of $\varphi 3$ ($2\pi/3$), the voltage pattern VPd in FIG. 7D, which is a voltage pattern obtained by inverting the voltage pattern VPc, is usable to form interference fringes having a phase of $\varphi 6$ ($5\pi/3$). When the voltage pattern VPe in FIG. 7E is used to form interference fringes having a phase of $\varphi 5$ ($4\pi/3$), the voltage pattern VPf in FIG. 7F, which is a voltage pattern obtained by inverting the voltage pattern VPe, is usable to form interference fringes having a phase of $\varphi 2$ ($\pi/3$).

The controller 15 only needs to apply a first voltage pattern to at least some of the pixel electrodes 47 in a period for a first frame during which the imaging device 3 takes an image, and apply a second voltage pattern obtained by inverting the first voltage pattern in a period for a second frame during which an image of the sample X is taken. Pixel electrodes 47 in which voltage patterns applied in the period for the first frame and the period for the second frame are inverted may be a part of the pixel electrodes 47 or all of the pixel electrodes 47 (the same applies hereinafter).

Next, an observation method in the 3D-SIM mode is described based on the operation of the structured illumination microscope 1. While changing the conditions of interference fringes as illustrated in FIG. 6, the structured illumination microscope 1 acquires images of a sample X illuminated with the interference fringes under the conditions. For example, the conditions of interference fringes in the 3D-SIM mode are as illustrated in FIG. 12. In this case, the structured illumination microscope 1 changes the direction of interference fringes in three patterns, and changes the phase in six patterns for each direction of interference fringes, thereby acquiring images of the sample X illuminated with interference fringes under eighteen conditions obtained by a combination of the direction and the phase of interference fringes.

Figure 13:
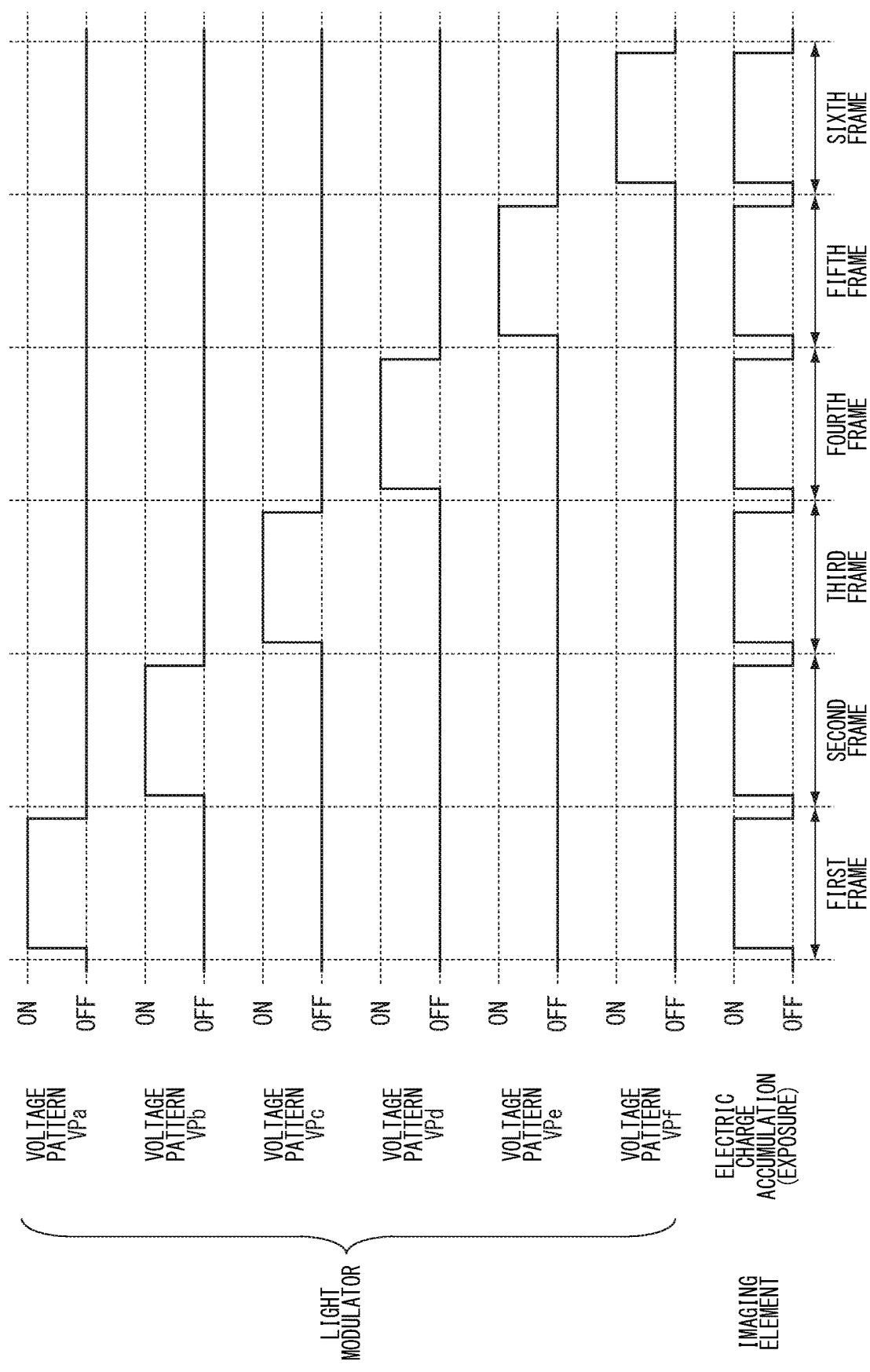
FIG. 13 is a timing chart illustrating operations of the light modulator and the imaging element.

FIG. 13 is a timing chart illustrating operations of the light modulator 41 and the imaging element 36 for acquiring six images related to the first direction. An example where the phase of interference fringes is changed in six patterns by using six kinds of voltage patterns illustrated in FIG. 7 is now described. Voltage patterns used in the 3D-SIM mode may be different from voltage patterns used in the 2D-SIM mode in at least one of the period, the phase, and the direction (for example, periodic direction).

Before the first frame is started, the controller 15 supplies a drive signal (for example, bitmap data) indicating a voltage pattern VPa to the light modulator 41. In the first frame, the light modulator 41 applies positive potential (for example, +V1) and negative potential (for example, −V1) such that the distribution of voltage values of the pixel electrodes 47 becomes the first voltage pattern VPa. In this manner, interference fringes having a phase of φ1 are formed on the sample X. The controller 15 controls the imaging element 36 such that electric charges due to light from the sample X are accumulated in the photoelectric conversion element in each pixel of the imaging element 36 in the first frame.

Before the second frame next to the first frame is started, the controller 15 supplies a drive signal indicating a voltage pattern VPb having a reverse relation with the voltage pattern VPa in the first frame to the light modulator 41. In the second frame, the light modulator 41 holds the distribution of voltage values of the pixel electrodes 47 to the voltage pattern VPb. In this manner, interference fringes having a phase of φ4 are formed on the sample X. The controller 15 controls the imaging element 36 such that electric charges due to light from the sample X are accumulated in the photoelectric conversion element in each pixel of the imaging element 36 in the second frame.

In the first frame, an electric field corresponding to a drive signal is applied to the liquid crystal layer 44 in the light modulator 41, so that the bias in electric charges may occur between the first substrate 42 side and the second substrate 43 side. In the second frame, however, an electric field obtained by inverting the electric field in the first frame is applied to the liquid crystal layer 44 in the light modulator 41, and hence at least a part of the bias in electric charges (for example, image burn-in) generated in the first frame is eliminated. In this manner, the structured illumination microscope 1 is able to suppress the occurrence of image burn-in in the light modulator 41 by using a part of an exposure period of the imaging element 36.

Before the third frame is started, the controller 15 supplies a drive signal indicating a voltage pattern VPc to the light modulator 41. In the third frame, the light modulator 41 holds the distribution of voltage values of the pixel electrodes 47 to the voltage pattern VPc. In this way, interference fringes having a phase of φ3 are formed on the sample X. The light modulator 41 is able to form voltage patterns in the third frame with high accuracy because at least a part of the bias in electric charges has been eliminated in the second frame. The controller 15 controls the imaging element 36 such that electric charges due to light from the sample X are accumulated in the photoelectric conversion element in each pixel of the imaging element 36 in the third frame.

Before the fourth frame next to the third frame is started, the controller 15 supplies a drive signal indicating a voltage pattern VPd having a reverse relation with the voltage pattern VPc in the third frame to the light modulator 41. In the fourth frame, the light modulator 41 holds the distribution of voltage values of the pixel electrodes 47 to the voltage pattern VPd. At least a part of the bias in electric charges generated in the light modulator 41 in the third frame is eliminated in the fourth frame. Interference fringes having a phase of φ6 are formed on the sample X. The controller 15 controls the imaging element 36 such that electric charges due to light from the sample X are accumulated in the photoelectric conversion element in each pixel of the imaging element 36 in the fourth frame.

Before the fifth frame is started, the controller 15 supplies a drive signal indicating a voltage pattern VPe to the light modulator 41. In the fifth frame, the light modulator 41 holds the distribution of voltage values of the pixel electrodes 47 to the voltage pattern VPe. In this manner, interference fringes having a phase of φ5 are formed on the sample X. The light modulator 41 is able to form voltage patterns in the fifth frame with high accuracy because at least a part of the bias in electric charges has been eliminated in the fourth frame. The controller 15 controls the imaging element 36 such that electric charges due to light from the sample X are accumulated in the photoelectric conversion element in each pixel of the imaging element 36 in the fifth frame.

Before the sixth frame next to the fifth frame is started, the controller 15 supplies a drive signal indicating a voltage pattern VPf having a reverse relation with the voltage pattern VPe in the fifth frame to the light modulator 41. In the sixth frame, the light modulator 41 holds the distribution of voltage values of the pixel electrodes 47 to the voltage pattern VPf. At least a part of the bias in electric charges generated in the light modulator 41 in the fifth frame is eliminated in the sixth frame. Interference fringes having a phase of φ2 are formed on the sample X. The controller 15 controls the imaging element 36 such that electric charges due to light from the sample X are accumulated in the photoelectric conversion element in each pixel of the imaging element 36 in the sixth frame.

The controller 15 acquires six images in which the periodic direction of interference fringes is the first direction and the phase thereof has six patterns through the imaging in the first to the sixth frames. The controller 15 similarly acquires images also for the case where the periodic direction of interference fringes is the second direction and the case where the periodic direction of interference fringes is the third direction. In this manner, the control device 4 changes the direction of interference fringes in three patterns, and changes the phase in six patterns for each direction, thereby acquiring eighteen images. The demodulator 40 uses the eighteen images to execute demodulation processing, and generates data on a super-resolution image.

In the present embodiment, a predetermined voltage pattern is formed in an odd-numbered frame (for example, first frame), and a voltage pattern obtained by inverting the predetermined voltage pattern is formed in a frame next to the odd-numbered frame. This operation enables the next odd-numbered frame to be started in the state in which the bias in electric charges in the light modulator 41 is eliminated. Imaging of a frame (second frame) having a reverse relation with an odd-numbered frame (for example, first frame) may be performed in any of the second to the sixth frames. Also in such a case, at least a part of the bias in electric charges generated in the light modulator in the first frame is able to be eliminated in the second frame.

In the present embodiment, when the number of frames for imaging is even (for example, 6), an odd-numbered frame (for example, first frame) and the next even-numbered frame (second frame) are paired, and a voltage pattern is inverted in the pair of frames. In the case of six images acquired for each direction of interference fringes, for example, the structured illumination device 2 inverts voltage patterns in all pairs (three pairs) of frames, but only needs to invert voltage patterns in at least one pair of frames among the pairs of frames. Also in such a case, the structured illumination device 2 is able to reduce the bias in electric charges (image burn-in) in the light modulator 41 by using at least a part of the exposure period of the imaging element 36. For example, in the case of eliminating the bias in electric charges in a period other than the exposure period by acquiring five images while changing the phase of interference fringes in the state in which the direction thereof is set to a predetermined direction, it takes a time of ten frames, but in the present embodiment, images are able to be acquired in a time corresponding to six frames, and the bias in electric charges is able to be eliminated. By acquiring six images in one direction of the periodic direction of interference fringes, the demodulation processing is able to be performed with high accuracy.

The number of images used for demodulation processing is different depending on an algorithm of the demodulation processing. To acquire super-resolution effect in three directions, for example, as disclosed in U.S. Pat. No. 8,115,806, five images having different phases may be acquired for each direction of interference fringes. In this case, the structured illumination device 2 only needs to omit image acquisition corresponding to one frame period among the above-mentioned six frame periods. In such a case, the structured illumination device 2 is able to reduce the bias in electric charges (image burn-in) in the light modulator 41 by using at least a part of the exposure period of the imaging element 36.

As described above, according to the control method in the present embodiment, images are able to be acquired with a smaller number of patterns in a shorter period of time although the number of images to be acquired is increased as compared with the case where five voltage patterns and inverted patterns thereof are prepared in order to acquire five images having different phases necessary in the 3D-SIM mode as disclosed in, for example, U.S. Pat. No. 8,115,806.

To acquire super-resolution effect in three directions, for example, as disclosed in PCT No. 2014/013720, demodulation images may be performed with fewer than fifteen images. For example, under the condition where the direction of interference fringes is the first direction, the phase of interference fringes is changed in four patterns of 0, $\pi/2$, $\pi$, and $3\pi/2$, and under the conditions where the direction of the interference fringes is the second direction and the third direction, the phase of interference fringes is changed in two patterns of 0 and $\pi$ for each direction. In this case, under the condition where the direction of interference fringes is the first direction, the structured illumination device 2 may invert voltage patterns for a pair of frames in which the phases of interference fringes are 0 and $\pi$, and may invert voltage patterns for a pair of frames in which the phases of interference fringes are $\pi/2$ and $3\pi/2$. Under the conditions where the direction of interference fringes is the second direction and the third direction, the structured illumination device 2 may invert, for each direction, voltage patterns for a pair of frames in which the phases of interference fringes are 0 and $\pi$.

Next, an example of demodulation processing executed by the demodulator 40 is described. The demodulator 40 can generate a restored image by using modulated images taken with different orientations and directions of the interference fringes. For example, the demodulator 40 can perform the demodulation processing disclosed in U.S. Pat. No. 8,115,806, but the demodulation processing is not limited to this method.

The control device 4 according to the above-mentioned embodiment includes a computer including a memory and a CPU. For example, the computer reads a microscope control program recorded in a recording medium such as the storage device 6, and executes control on the components in the structured illumination microscope 1 in accordance with the microscope control program, thereby causing the components in the structured illumination microscope 1 to execute processing.

The microscope control program causes a computer to execute control on a structured illumination microscope that branches, by a brancher that includes a first substrate on which a plurality of pixel electrodes are provided, a second substrate opposed to the first substrate, and a ferroelectric liquid crystal disposed between the first substrate and the second substrate, light from a light source into a plurality of diffracted light beams, illuminates a sample with interference fringes formed by at least some of the diffracted light beams, forms an image of the sample irradiated with the interference fringes, takes the image, performs demodulation processing by using a plurality of the taken images, and controls a direction and a phase of the interference fringes. The controlling on the direction and the phase includes applying, in one frame period for taking the image, a first voltage pattern and a second voltage pattern obtained by inverting the first voltage pattern to at least some of the pixel electrodes.

Alternatively, the microscope control program causes a computer to execute control on a structured illumination microscope that branches, by a brancher that includes a first substrate on which a plurality of pixel electrodes are provided, a second substrate opposed to the first substrate, and a ferroelectric liquid crystal disposed between the first substrate and the second substrate, light from a light source into a plurality of diffracted light beams, illuminates a sample with interference fringes formed by at least some of the diffracted light beams, forms an image of the sample irradiated with the interference fringes, takes the image formed by the imaging optical system, performs demodulation processing by using a plurality of the taken images, and controls a direction and a phase of the interference fringes. The controlling on the direction and the phase includes applying a first voltage pattern to at least some of the pixel electrodes in a period for a first frame during which an image of the sample is taken, and applying a second voltage pattern obtained by inverting the first voltage pattern in a period for a second frame during which an image of the sample is taken, and the demodulation processing uses at least an image taken in the first frame period and an image taken in the second frame period.

The above-mentioned computer programs may be recorded in a computer-readable recording medium including portable media such as a flexible disk, a magnetooptical disc, a ROM, and a CD-ROM or a hard disk built in a computer system. When the computer uses a WWW system, the computer may include a website providing environment (or display environment). The computer-readable recording medium may include the one that dynamically holds a computer program for a short period of time such as a communication line used to transmit a computer program through a network such as the Internet or lines of communication such as a telecommunication line, and the one that holds a computer program for a given period of time such as a volatile memory in a computer system serving as a server or a client in that case. The computer programs may cause a computer to execute a part of processing performed by the structured illumination device 2.

At least a part of the controller 15 may be provided separately from the control device 4, and, for example, may be provided in the light modulator 41. In this case, for example, in the 2-D SIM mode, the control device 4 may supply bitmap data indicating a pattern of interference fringes to the controller 15, and the controller 15 may generate a first voltage pattern corresponding to the bitmap data and a second voltage pattern obtained by inverting the first voltage pattern, and drive pixel electrodes in the light modulator 41.

In the 3D-SIM mode, it is desired that the intensity of diffracted light used to form interference fringes among a plurality of diffracted light beams be adjusted as appropriate. For example, in the case of forming interference fringes by 0th order diffracted light and 1st order diffracted light among a plurality of diffracted light beams, it is desired that the ratio of intensity between 0th order diffracted light and 1st order diffracted light be adjusted in advance. However, for example, when diffracted light is generated by using ferroelectric liquid crystals, it is not easy to adjust the intensity of diffracted light of each order depending on cases. For example, the document "L. Shao et al., Nat. Method 8, 1044 (2011)" indicates that the intensity of diffracted light of each order is adjusted by duty, but the resolution of duty change may be insufficient. When a ½ wavelength plate is used to adjust the polarization direction of light entering an SLM and the direction of the cone center (cone half angle), the influence of wavelength characteristics may be high.

Now, a method for adjusting (setting) the intensity of diffracted light used to form interference fringes among a plurality of diffracted light beams is described. In the present embodiment, the angle between the polarization direction of the illumination light L1 entering the light modulator 41 (see FIG. 3) and the cone center of the liquid crystal layer 44 (see FIG. 2) in the light modulator 41 is adjusted to adjust the intensity of diffracted light. For example, the cone center of the liquid crystal layer 44 in the light modulator 41 is adjusted in advance by subjecting an alignment film (not shown) provided in the light modulator 41 to surface treatment such as rubbing. In this case, the angle between the polarization direction of the illumination light L1 entering the light modulator 41 and the cone center of the liquid crystal layer 44 in the light modulator 41 is adjusted by the direction of the light modulator 41.

Figure 14A:
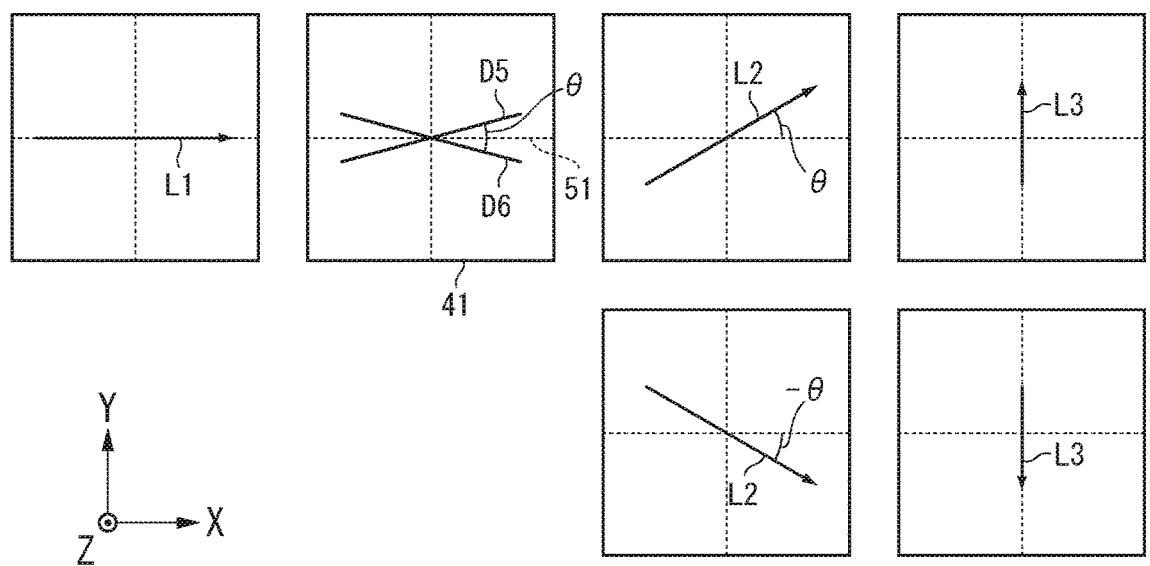
FIGS. 14A and 14B include explanatory diagrams illustrating the relation between the orientation of the light modulator and illumination light exiting from a polarization separation element.
Figure 14B:
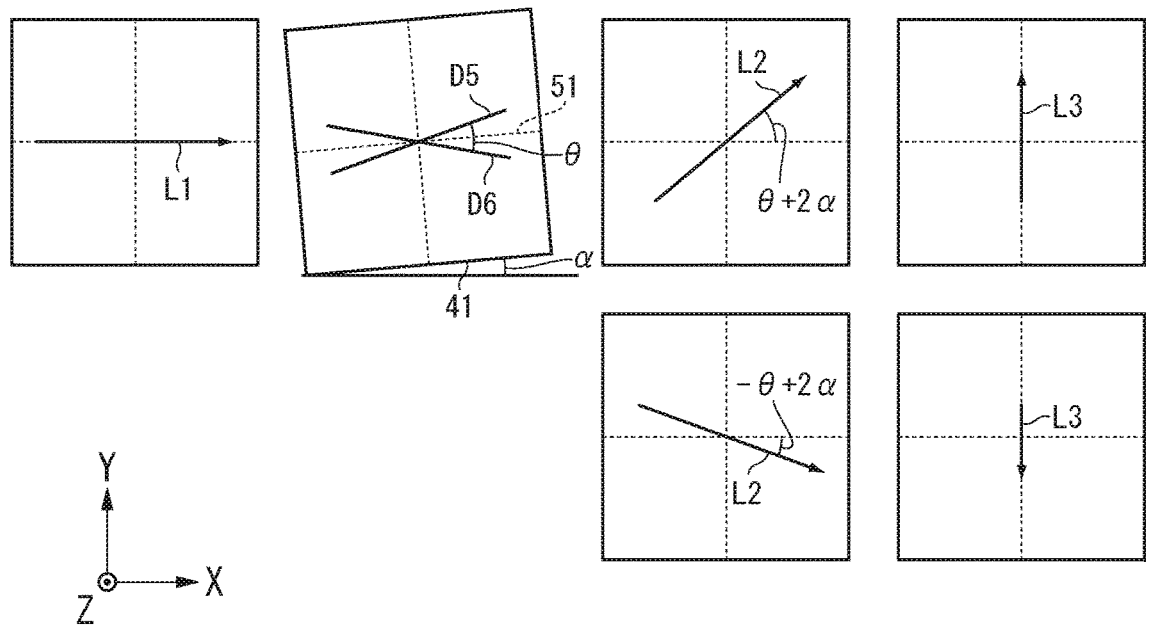

FIG. 14 includes explanatory diagrams illustrating the relation between the orientation of the light modulator 41 and the illumination light L3 exiting from the polarization separation element 12 (see FIG. 3 as appropriate for the polarization separation element 12, the light modulator 41, and the illumination light L1 to the illumination light L3). FIG. 14A illustrates the case where the direction of the cone center (denoted by reference sign 51 in FIG. 14) of liquid crystal molecules of the liquid crystal layer 44 in the light modulator 41 is parallel to the polarization direction of the illumination light L1 entering the light modulator 41 (X direction). FIG. 14B illustrates the case where the direction of the cone center 51 has an angle of α (α>0) with the polarization direction of the illumination light L1 entering the light modulator 41.

The cone center 51 is a center line between a direction D5 of the director of liquid crystal molecules applied with positive voltage and a direction D6 of the director of liquid crystal molecules applied with negative voltage. Reference sign θ in FIG. 14 represents the angle between the direction D5 and the direction D6 of the directors (hereinafter referred to as "cone angle").

As illustrated in FIG. 14A (see the first diagram from the left), the polarization state of illumination light L1 from the polarization separation element 12 toward the light modulator 41 is linear polarization in the X direction. The direction of the cone center 51 of the light modulator 41 (see the second diagram from the left) is set to be parallel to the polarization direction of the illumination light L1 (X direction). First, the state in which positive voltage is applied is described. In a pixel applied with positive voltage, the angle between the direction D5 of the director and the polarization direction of the illumination light L1 (X direction) is θ/2, with the counterclockwise direction being positive. The angle between the polarization direction of illumination light L2 that has passed through the pixel applied with positive voltage (see the third upper diagram from the left) and the X direction is θ, with the counterclockwise direction being positive. Illumination light L3, which has been reflected by the polarization separation film 12a (see FIG. 3), in the illumination light L2 is linearly polarized light in the Y direction in the illumination light L2, and the angle between the polarization direction of the illumination light L3 and the X direction is +π/2, with the counterclockwise direction being positive. Next, the state in which negative voltage is applied is described. In a pixel applied with negative voltage, the angle between the direction D6 of the director and the polarization direction of the illumination light L1 (X direction) is −θ/2, with the counterclockwise direction being positive. The angle between the polarization direction of the illumination light L2 that has passed through the pixel applied with negative voltage (see the third lower diagram from the left) and the X direction is −θ, with the counterclockwise direction being positive. Illumination light L3, which has been transmitted through the polarization separation film 12a, in the illumination light L2 is linearly polarized light in the Y direction in the illumination light L2, and the angle between the polarization direction of the illumination light L3 and the X direction is −π/2, with the counterclockwise direction being positive. In this manner, when the direction of the cone center 51 is parallel to the polarization direction of the illumination light L1 entering the light modulator 41, the light modulator 41 and the polarization separation element 12 serve as a phase difference-based diffraction grating having a phase difference of π.

Next, the case where the direction of the cone center is non-parallel to the polarization direction of illumination light L1 entering the light modulator 41 is described. As illustrated in FIG. 14B (see the first diagram from the left), the polarization state of the incident light L1 is linear polarization in the X direction. The angle between the direction of the cone center 51 (see the second diagram from the left) and the polarization direction of the illumination light L1 (X direction) is a, with the counterclockwise direction being positive. First, the state in which positive voltage is applied is described. In a pixel applied with positive voltage, the angle between the direction D5 of the director and the polarization direction of the illumination light L1 (X direction) is $\theta/2+\alpha$, with the counterclockwise direction being positive. The angle between the polarization direction of the illumination light L2 that has passed through the pixel applied with positive voltage (see the third upper diagram from the left) and the X direction is $\theta+2\alpha$, with the counterclockwise direction being positive. Illumination light L3, which has been transmitted through the polarization separation film 12a, in the illumination light L2 is linearly polarized light in the Y direction in the illumination light L2, and the angle between the polarization direction of the illumination light L3 and the X direction is $+\pi/2$, with the counterclockwise direction being positive. Next, the state in which negative voltage is applied is described. In a pixel applied with negative voltage, the angle between the direction D6 of the director and the polarization direction of the illumination light L1 (X direction) is $-\theta/2+\alpha$, with the counterclockwise direction being positive. The angle between the polarization direction of the illumination light L2 that has passed through the pixel applied with negative voltage (see the third lower diagram from the left) and the X direction is $-\theta+2\alpha$, with the counterclockwise direction being positive. Illumination light L3, which has been transmitted through the polarization separation film 12a, in the illumination light L2 is linearly polarized light in the Y direction in the illumination light L2, and the angle between the polarization direction of the illumination light L3 and the X direction is $-\pi/2$, with the counterclockwise direction being positive. When the light modulator 41 is inclined by $\alpha$, the intensity of the illumination light L3 exiting from the polarization separation element 12 (indicated by the size of arrows in the fourth upper and lower diagrams from the left in FIG. 14B) in the state in which positive voltage is applied (upper figure) becomes stronger than that in the state in which negative voltage is applied (lower diagram). As described above, when the direction of the cone center 51 is non-parallel to the polarization direction of the illumination light L1 entering the light modulator 41, the light modulator 41 and the polarization separation element (see FIG. 3) serve as a phase difference-based diffraction grating having a phase difference of n and an amplitude diffraction grating. Thus, for example, the intensity of 0th order diffracted light becomes intensity corresponding to the orientation (for example, angle $\alpha$) of the light modulator 41, and the ratio of intensity between 0th order diffracted light and 1st order diffracted light is able to be adjusted (set).

Figure 15A:
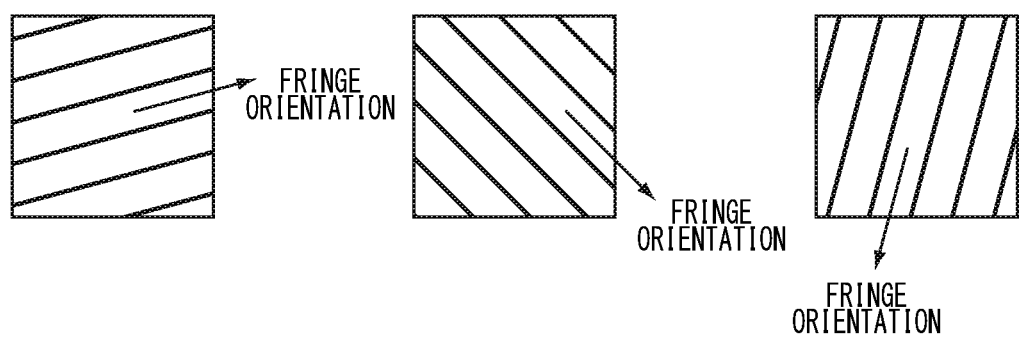
FIGS. 15A and 15B includes diagrams illustrating an example of interference fringes.
Figure 15B:
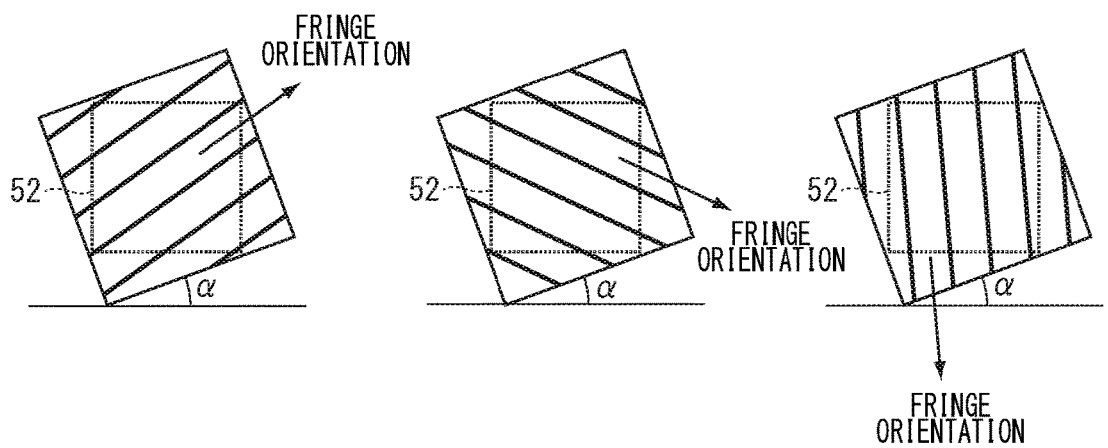

FIG. 15 includes diagrams illustrating examples of interference fringes. For example, FIG. 15A illustrates interference fringes corresponding to FIG. 14A. For example, FIG. 15B illustrates interference fringes corresponding to FIG. 14B. FIG. 15A and FIG. 15B illustrate interference fringes each obtained by changing the fringe orientation (line direction) in three patterns. In FIG. 15B, reference sign 52 represents a field of view of the imaging device 3 (see FIG. 10). When the orientation of the light modulator 41 is changed by the angle $\alpha$ as described above, the fringe orientation of interference fringes changes by the angle $\alpha$. Thus, the fringe orientation of interference fringes changes in the field of view of the imaging device 3.

Pixels in the light modulator 41 have finite sizes, and hence an ideal fringe pattern is not always displayed depending on the arrangement direction of voltage patterns to be displayed and the period thereof. For example, when a voltage pattern is formed such that diffracted light is generated in the arrangement direction of pixels in the light modulator 41, the period of the voltage pattern is always an integer, which may make it difficult to display a voltage pattern having a desired period. It is thus desired that the orientation of the light modulator 41 be rotated in a plane such that all orientations of diffracted light beams corresponding to a plurality of pieces of structured illumination are different from the arrangement direction of pixels in the light modulator 41. Alternatively, the imaging element may be rotated within a light receiving plane with respect to the light modulator 41 such that the light modulator 41 is relatively rotated.

In FIG. 3 and other figures, illumination light L1 that has been transmitted through the polarization separation film 12a among the illumination light L1 from the light source 20 enters the light modulator 41, but illumination light reflected by the polarization separation film 12a among the illumination light L1 from the light source 20 may enter the light modulator 41. In this case, it is preferred to set the polarization state of the illumination light L1 to S-polarization with respect to the polarization separation film 12a. Illumination light that has been transmitted through the polarization separation film 12a (P-polarized light with respect to polarization separation film 12a) among the illumination light exiting from the light modulator 41 only needs to be applied to the sample S.

The technical scope of the present invention is not limited to the embodiments and modifications described above. For example, one or more requirements described in the embodiments and modifications may be omitted. The requirements described in the embodiments and modifications may be combined as appropriate. As far as laws and regulations permit, the entire contents of the documents cited in the above-mentioned embodiments and the like are incorporated herein by reference.

DESCRIPTION OF REFERENCE SIGNS

1 . . . structured illumination microscope, 2 . . . structured illumination device, 3 . . . imaging device, X . . . sample, 13 . . . brancher, 15 . . . controller, 41 . . . light modulator, 42 . . . first substrate, 43 . . . second substrate, 45 . . . counter electrode, 47 . . . pixel electrode, VPa to VPf . . . voltage pattern

What is claimed is:

1. A structured illumination microscope, comprising:
an optical modulator including (i) a substrate provided with a plurality of pixel electrodes and (ii) an electro-optic element;
an illumination optical system that illuminates a sample with an interference fringe formed by at least some of a plurality of light beams emitted by the optical modulator, the illumination optical system being switchable between a 2D-SIM mode and a 3D-SIM mode;
an imaging device that captures an image of the sample illuminated with the interference fringe;
a demodulator that generates an image of the sample using a plurality of the images captured by the imaging device; and
a controller, wherein:
the controller applies (i) a first voltage pattern to at least some of the plurality of pixel electrodes in a first frame period during which the imaging device captures the image and (ii) a second voltage pattern that is inverted with respect to the first voltage pattern in a second frame period during which the image is captured, and
the demodulator performs a demodulation process using at least (i) an image captured in the first frame period and (ii) an image captured in the second frame period.

2. The structured illumination microscope according to claim 1, wherein the second frame period is a frame period next to the first frame period.

3. The structured illumination microscope according to claim 1, wherein
the controller applies a plurality of voltage patterns such that a plurality of interference fringes in which phases are shifted from each other by $2\pi/N+1$, N being an odd number,
the imaging device captures at least N images having different phases of the interference fringes, and
the demodulator generates the image of the sample by using the at least N images.

4. The structured illumination microscope according to claim 3, wherein
the imaging device captures N+1 images having different phases of the interference fringes, and
the demodulator generates an image of the sample by using the N+1 images.

5. The structured illumination microscope according to claim 3, wherein N=5.

6. The structured illumination microscope according to claim 3, wherein
a plurality of voltage patterns include a first voltage pattern group and a second voltage pattern group, and a voltage pattern included in the first voltage pattern group is a pattern obtained by inverting a voltage pattern included in the second voltage pattern group.

7. The structured illumination microscope according to claim 1, wherein the illumination optical system forms (i) a first interference fringe by diffracted light that is diffracted by the optical modulator driven with the first voltage pattern, and forms (ii) a second interference fringe with a phase shifted by it from a phase of the first interference fringe by diffracted light that is diffracted by the optical modulator driven with the second voltage pattern.

8. The structured illumination microscope according to claim 1, wherein the illumination optical system illuminates the sample by forming the interference fringe by interference between 0th order diffracted light and 1st order diffracted light.

9. The structured illumination microscope according to claim 1, wherein:
the electro-optic element is a liquid crystal.

10. The structured illumination microscope according to claim 1, wherein:
the electro-optic element is a ferroelectric liquid crystal.

11. The structured illumination microscope according to claim 1, wherein:
in the 2D-SIM mode, the interference fringe is formed by generating an interference pattern between a +1 first-order diffractive mode and a −1 first-order diffractive mode, and
in the 3D-SIM mode, the interference fringe is formed by generating interference patterns between (i) the +1 first-order diffractive mode and the −1 first-order diffractive mode, (ii) the +1 first-order diffractive mode and a zero-order diffractive mode, and (iii) the −1 first-order diffractive mode and the zero-order diffractive mode.

12. An observation method, comprising:
branching light from a light source into a plurality of diffracted light beams by an optical modulator including (i) a substrate provided with a plurality of pixel electrodes and (ii) an electro-optic element;
illuminating, using an illumination optical system switchable between a 2D-SIM mode and a 3D-SIM mode, a sample with an interference fringe formed by at least some of the plurality of diffracted light beams;
capturing images of the sample illuminated with the interference fringe;
performing a demodulation process using a plurality of the captured images;
applying (i) a first voltage pattern to at least some of the plurality of pixel electrodes in a first frame period during which the images are captured and (ii) a second voltage pattern that is inverted with respect to the first voltage pattern in a second frame period during which the images are captured; and
performing the demodulation process using at least (i) an image captured in the first frame period and (ii) an image captured in the second frame period.

13. A non-transitory computer readable storage medium storing therein a program that causes a computer to execute control on a structured illumination microscope, the control comprising:
branching light from a light source into a plurality of diffracted light beams by an optical modulator including (i) a substrate provided with a plurality of pixel electrodes and (ii) an electro-optic element,
illuminating, using an illumination optical system switchable between a 2D-SIM mode and a 3D-SIM mode, a sample with an interference fringe formed by at least some of the plurality of diffracted light beams,
capturing images of the sample illuminated with the interference fringe,
performing a demodulation process using a plurality of the captured images,
applying (i) a first voltage pattern to at least some of the plurality of pixel electrodes in a first frame period during which the images are captured and (ii) a second voltage pattern that is inverted with respect to the first voltage pattern in a second frame period during which the images are captured, and
performing the demodulation process using at least (i) an image captured in the first frame period and (ii) an image captured in the second frame period.

* * * * *